(12) United States Patent
Fusayasu et al.

(10) Patent No.: US 9,930,212 B2
(45) Date of Patent: Mar. 27, 2018

(54) IMAGE READING DEVICE GENERATING BLACK CORRECTION DATA FOR SHADE CORRECTION BASED ON INTERMEDIATE DATA ACQUIRED AT DIFFERENT POSITIONS IN THE SUB-SCANNING DIRECTION

(71) Applicant: Panasonic Intellectual Property Management Co., Ltd., Osaka (JP)

(72) Inventors: Hirotsugu Fusayasu, Kyoto (JP); Ryo Matsubara, Osaka (JP); Katsuo Inokuchi, Fukuoka (JP); Tatsuya Hirota, Fukuoka (JP); Yuuichi Tutiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/346,067

(22) Filed: Nov. 8, 2016

(65) Prior Publication Data
US 2017/0054872 A1 Feb. 23, 2017

Related U.S. Application Data

(63) Continuation of application No. PCT/JP2016/001191, filed on Mar. 4, 2016.

(30) Foreign Application Priority Data

Mar. 27, 2015 (JP) ................................ 2015-067383

(51) Int. Cl.
*H04N 1/00* (2006.01)
*H04N 1/028* (2006.01)
(Continued)

(52) U.S. Cl.
CPC ......... *H04N 1/401* (2013.01); *H04N 1/00005* (2013.01); *H04N 1/00013* (2013.01);
(Continued)

(58) Field of Classification Search
CPC .... H04N 1/028; H04N 1/02885; H04N 1/047; H04N 1/40; H04N 1/40006; H04N 1/401; H04N 1/407; H04N 1/6027; H04N 1/00002; H04N 1/00013; H04N 1/00018; H04N 1/00034; H04N 1/00039; H04N 1/00045;
(Continued)

(56) References Cited

U.S. PATENT DOCUMENTS 4,974,072 A 11/1990 Hasegawa
5,206,501 A * 4/1993 Sakakibara .......... H04N 1/4078
358/461

(Continued)

FOREIGN PATENT DOCUMENTS

JP 1-101061 4/1989
JP 2-254867 10/1990
(Continued)

OTHER PUBLICATIONS

International Search Report dated Apr. 5, 2016 in International (PCT) Application No. PCT/JP2016/001191.

*Primary Examiner* — Scott A Rogers
(74) *Attorney, Agent, or Firm* — Wenderoth, Lind & Ponack, L.L.P.

(57) ABSTRACT

An image reading device has an image processor that generates correction data to be used for shading correction and performs the shading correction using the correction data. The image processor generates intermediate data with a predetermined density level, generates intermediate data in different positions in the sub-scanning direction based on image signals of a first reference plate and a second reference plate disposed in the different positions, generates first and second black correction data based on the respective intermediate data, generates black correction data according to the sub-scanning direction based on both the black correction data, and performs the shading correction using the black correction data in the respective positions in the sub-scanning direction.

4 Claims, 16 Drawing Sheets

(51) Int. Cl.

| | | |
|---|---|---|
| *H04N 1/031* | (2006.01) | |
| *H04N 1/04* | (2006.01) | |
| *H04N 1/40* | (2006.01) | |
| *H04N 1/401* | (2006.01) | |
| *H04N 1/12* | (2006.01) | |
| *H04N 1/19* | (2006.01) | |
| *H04N 1/191* | (2006.01) | |
| *H04N 1/193* | (2006.01) | |

(52) U.S. Cl.
CPC ..... *H04N 1/00018* (2013.01); *H04N 1/00034* (2013.01); *H04N 1/00039* (2013.01); *H04N 1/00045* (2013.01); *H04N 1/00053* (2013.01); *H04N 1/00063* (2013.01); *H04N 1/00068* (2013.01); *H04N 1/00082* (2013.01); *H04N 1/00087* (2013.01); *H04N 1/02855* (2013.01); *H04N 1/031* (2013.01); *H04N 1/0311* (2013.01); *H04N 1/0318* (2013.01); *H04N 1/04* (2013.01); *H04N 1/12* (2013.01); *H04N 1/125* (2013.01); *H04N 1/19* (2013.01); *H04N 1/191* (2013.01); *H04N 1/193* (2013.01); *H04N 1/40006* (2013.01); *H04N 1/40056* (2013.01); *H04N 2201/0081* (2013.01)

(58) Field of Classification Search
CPC ............. H04N 1/0005; H04N 1/00053; H04N 1/00063; H04N 1/00068; H04N 1/00082; H04N 1/00087
See application file for complete search history.

(56) References Cited

U.S. PATENT DOCUMENTS

| | | | | |
|---|---|---|---|---|
| 5,371,613 | A * | 12/1994 | Arimoto | ................ H04N 1/401 358/461 |
| 6,151,419 | A | 11/2000 | Aoki | |
| 7,126,725 | B2 * | 10/2006 | Okutomi | ............. H04N 1/1013 358/474 |
| 7,391,533 | B2 | 6/2008 | Hiromatsu | |
| 7,619,785 | B2 * | 11/2009 | Sodeura | ............. H04N 1/00002 358/461 |
| 8,390,900 | B2 * | 3/2013 | Sakane | ............. H04N 1/00002 358/461 |
| 8,854,698 | B2 | 10/2014 | Uchida | |
| 9,525,800 | B2 * | 12/2016 | Horiguchi | ........... H04N 1/4076 |
| 9,769,347 | B2 * | 9/2017 | Chen | ........................ H04N 1/04 |
| 2003/0072497 | A1 | 4/2003 | Hiromatsu | |
| 2005/0206968 | A1 * | 9/2005 | Sodeura | ........... H04N 1/00002 358/474 |
| 2008/0055668 | A1 | 3/2008 | Hirayama | |
| 2008/0204782 | A1 | 8/2008 | Hiromatsu | |
| 2008/0204820 | A1 | 8/2008 | Ito | |
| 2010/0315687 | A1 * | 12/2010 | Sakane | ............. H04N 1/00002 358/461 |
| 2012/0069227 | A1 * | 3/2012 | Hasuo | .................... H04N 5/217 348/243 |
| 2017/0078527 | A1 * | 3/2017 | Fusayasu | ................ H04N 1/19 |
| 2017/0094114 | A1 * | 3/2017 | Inokuchi | ................ H04N 1/401 |
| 2017/0134613 | A1 * | 5/2017 | Matsubara | ............ H04N 1/401 |
| 2017/0214827 | A1 * | 7/2017 | Sasaki | ................ H04N 1/00801 |

FOREIGN PATENT DOCUMENTS

| | | |
|---|---|---|
| JP | 8-098017 | 4/1996 |
| JP | 10-327322 | 12/1998 |
| JP | 2002-135540 | 5/2002 |
| JP | 2003-198813 | 7/2003 |
| JP | 2008-60975 | 3/2008 |
| JP | 5007133 | 6/2012 |
| JP | 2012-249218 | 12/2012 |

\* cited by examiner

IMAGE READING DEVICE GENERATING BLACK CORRECTION DATA FOR SHADE CORRECTION BASED ON INTERMEDIATE DATA ACQUIRED AT DIFFERENT POSITIONS IN THE SUB-SCANNING DIRECTION

BACKGROUND

1. Technical Field

The present disclosure relates to an image reading device that reads an image of an object.

2. Description of the Related Art

Unexamined Japanese Patent Publication No. 2008-060975 discloses an image reading device including a white reference plate. The image reading device acquires white reference data from an output of a sensor when an image of the white reference plate is acquired with a light source turned on. In addition, the image reading device acquires black reference data from an output of the sensor with the light source turned off. The image reading device performs shading correction based on the thus acquired white reference data and black reference data.

Further, Unexamined Japanese Patent Publication No. 1110-327322 discloses an image reading device that defines a white reference level in a sub-scanning direction as well as a main scanning direction. The image reading device corrects the white reference level in the main scanning direction using a correction value calculated from the white reference level in the sub-scanning direction.

SUMMARY

An image reading device of the present disclosure that reads an image of an object includes a sensor module having a light source for illuminating the object and a plurality of sensors for reading light reflected from the object so as to acquire image signals, a data generator that generates black correction data to be a black reference in shading correction and white correction data to be a white reference in the shading correction, and a corrector that performs the shading correction on the image signals acquired by the plurality of sensors using the black correction data and the white correction data.

The plurality of sensors is disposed in the main scanning direction, and the image signals of the sensors constitute an image signal on a line extending in the main scanning direction.

The data generator generates black correction data based on intermediate data that is lower in a density level than the black reference and higher in a density level than the white reference. First, the data generator acquires the intermediate data based on an image signal of a first reference member disposed in a first position and extending in the main scanning direction. The data generator, then, generates first black correction data that is the black correction data in the first position based on the intermediate data.

The data generator acquires the intermediate data based on an image signal of a second reference member disposed in a second position different from the first position in the sub-scanning direction and extending in the main scanning direction. The data generator, then, generates second black correction data that is the black correction data in the second position based on the intermediate data. The data generator generates black correction data according to respective positions in the sub-scanning direction other than the first position and the second position based on the first black correction data and the second black correction data.

The corrector performs the shading correction using the black correction data in the respective positions in the sub-scanning direction so as to correct density unevenness of an image in the main scanning direction and the sub-scanning direction. Such density unevenness is caused by an interference between the image signals from the plurality of sensors.

With this configuration, the image reading device performs the shading correction using the correction data in the respective positions in the sub-scanning direction. This configuration can provide the image reading device that can reduce the density unevenness on the image in the main scanning direction and the sub-scanning direction caused by the interference between the image signals from the plurality of sensors.

DETAILED DESCRIPTION

Exemplary embodiments will be described in detail below with reference to the drawings appropriately. However, an unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the inventors of the present disclosure provide the accompanying drawings and the following description to help those skilled in the art to sufficiently understand the present disclosure, but do not intend to use the drawings or the description to limit the subject matters of the claims Background of the Disclosure In an image reading device such as a scanner that reads a document and then forms image data, a distortion is generated depending on the position of pixels. Such a distortion is caused by unevenness in light receiving elements of a sensor module such as a CCD (Charge Coupled Device) and a CIS (Contact Image Sensor), the difference in light converging performance between a central part and a peripheral part of a lens, and unevenness in a light amount distribution of a light source.

To address this problem, there is known an image reading device in which shading correction is performed on acquired image data. Further, there is known an image forming apparatus such as a multifunction peripheral and a copy machine including such an image reading device.

However, density unevenness is generated in an image in some cases in a configuration in which a plurality of sensors is disposed in a main scanning direction and in which the image signals constitute an image signal on a line extending in the main scanning direction. The density unevenness is caused by the interference between the outputs from the plurality of sensors. Such a density difference cannot be corrected sufficiently only by the above-described shading correction.

Particularly in a case of the image reading device with a wide reading region compatible with A3-size sheets, the density unevenness might be generated in an image not only in the main scanning direction but also in the sub-scanning direction. For this reason, an appropriate correction should be performed also in the sub-scanning direction.

Therefore, in order to solve the issue as described above, the present disclosure provides an image reading device in which the density unevenness in the image in the main scanning direction and the sub-scanning direction due to the interference between the image signals from the plurality of sensors is reduced.

Exemplary embodiments will be described in detail below with reference to the drawings.

First Exemplary Embodiment

[1. Configuration]
[1-1. Multifunction Peripheral]

Figure 1:
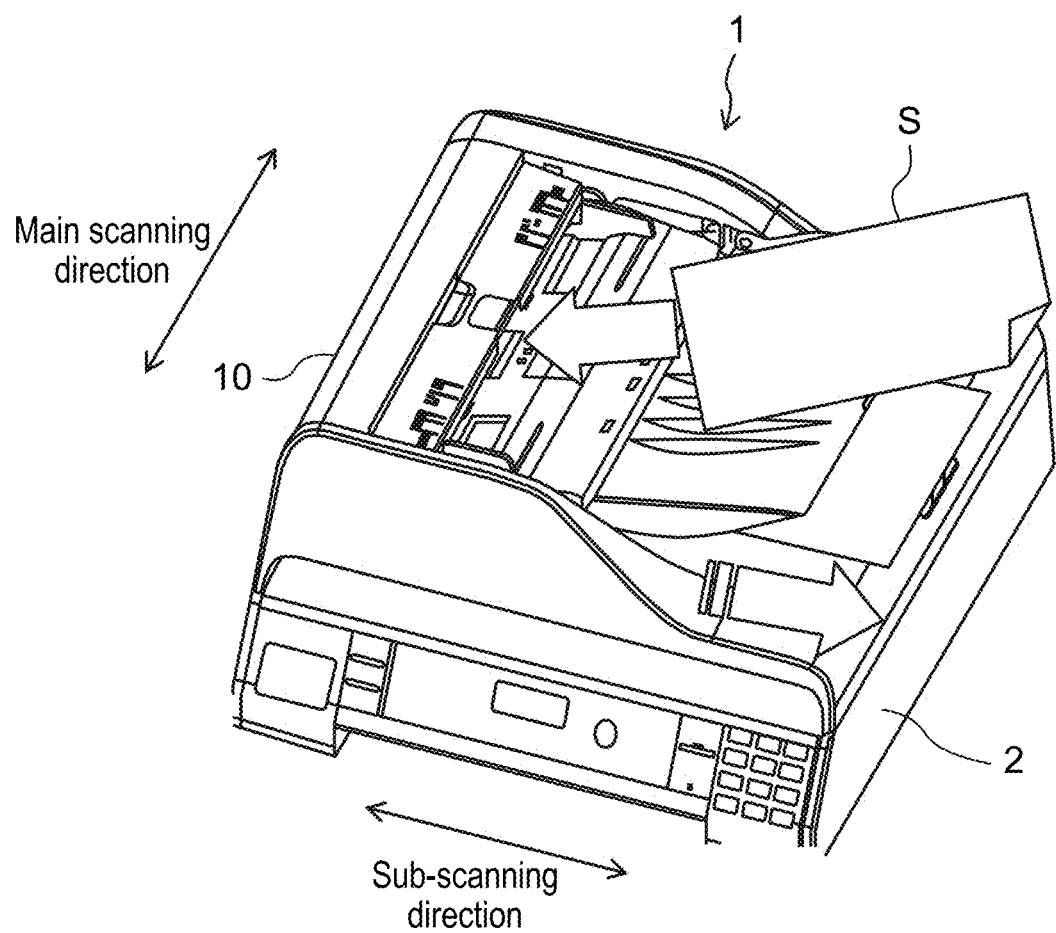
FIG. 1 is a perspective view of a multifunction peripheral of an image reading device in a first exemplary embodiment.
Figure 2:
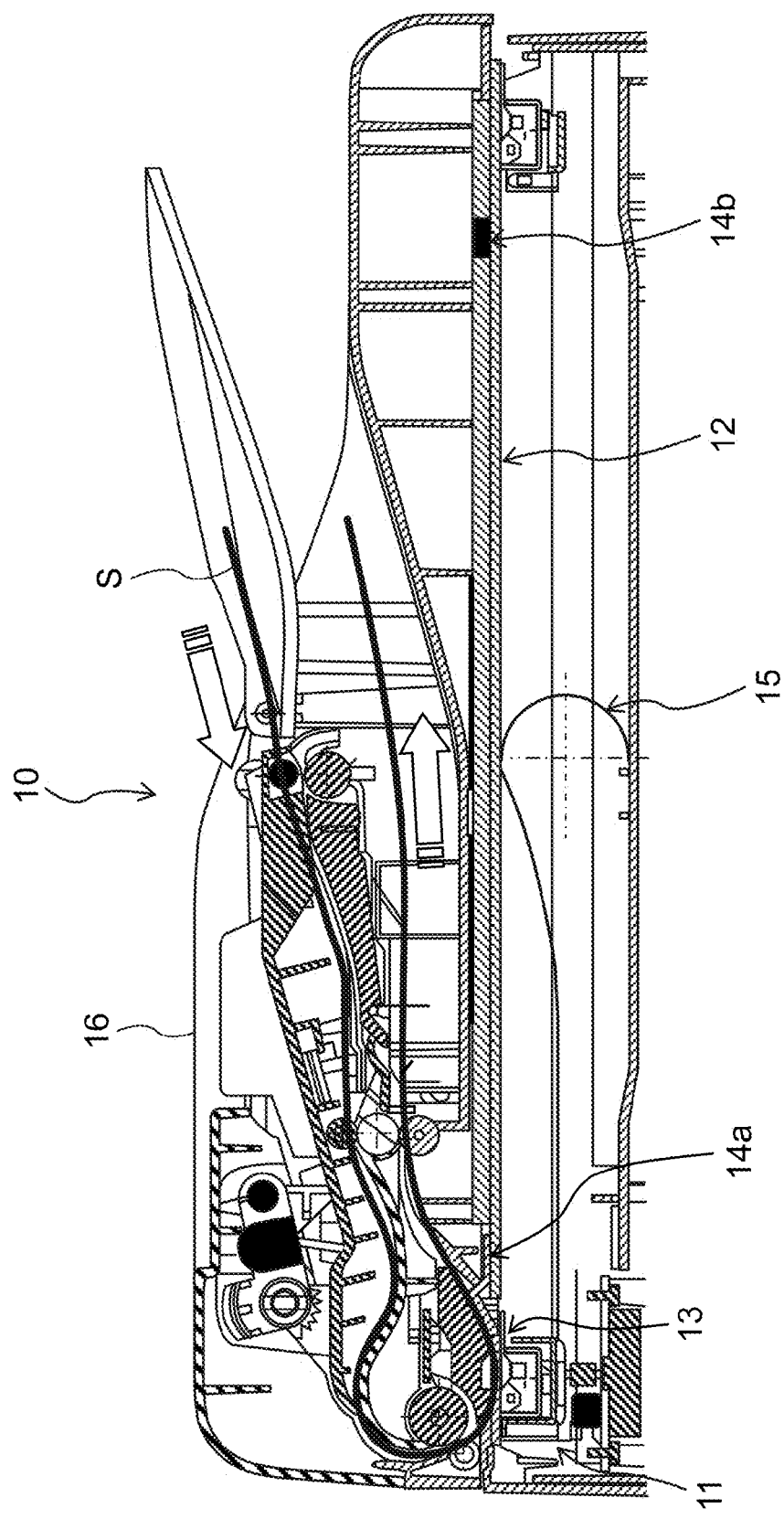
FIG. 2 is a sectional view of the multifunction peripheral in the first exemplary embodiment.

A hardware configuration of multifunction peripheral 1 including image reading device 10 in a first exemplary embodiment is described with reference to FIGS. 1 and 2. FIG. 1 is a perspective view of a multifunction peripheral of the image reading device in the first exemplary embodiment. FIG. 2 is a sectional view of the multifunction peripheral in the first exemplary embodiment.

Multifunction peripheral 1 includes main unit 2 and image reading device 10 mounted on an upper part of main unit 2. Multifunction peripheral 1 has a scan function performed by image reading device 10, and in addition, other functions (for example, a print function, a copy function, a facsimile transmission/reception function, and the like). Main unit 2 has a configuration according to a function of multifunction peripheral 1.

Image reading device 10 is an FB (Flat Bed) type image scanner as shown in FIGS. 1 and 2. Image reading device 10 has scanner unit 11, FB glass 12, ADF glass 13, first reference plate 14a, second reference plate 14b, ADF (Auto Document Feeder) 16, and controller 100 (see FIG. 5).

FB glass 12 and ADF glass 13 are disposed on an upper surface of main unit 2. FB glass 12 occupies the most part of the upper surface of main unit 2. On FB glass 12, document S is to be placed as a reading object.

ADF glass 13 reads document S fed by ADF 16. ADF 16 feeds document S automatically.

ADF 16 is disposed on main unit 2 such that ADF 16 covers FB glass 12 and ADF glass 13.

Scanner unit 11 acquires an image of a reading object. Scanner unit 11 moves in main unit 2 along bottom surfaces of FB glass 12 and ADF glass 13. The direction in which scanner unit 11 moves is referred to as a sub-scanning direction. FB glass 12 and ADF glass 13 are disposed in the sub-scanning direction.

Scanner unit 11 is driven by a motor (not shown) and moves in the sub-scanning direction along a guide (not shown). The motor is controlled by controller 100. Scanner unit 11 is connected to controller 100 through FFC (Flexible Flat Cable) 15. FFC 15 is a communication cable having signal lines therein. FFC 15 is long enough and flexible enough for scanner unit 11 to move smoothly within the movable range. Further, scanner unit 11 has sensor module 102 (see FIG. 3).

First reference plate 14a and second reference plate 14b are reference members for acquiring data for shading correction. First reference plate 14a is disposed on a position of the upper part of main unit 2 and between FB glass 12 and ADF glass 13. Second reference plate 14b is disposed on the upper part of main unit 2 and on a movable terminal position of scanner unit 11 in the sub-scanning direction (see FIG. 4). That is, first reference plate 14a and second reference plate 14b are disposed at an interval in the sub-scanning direction. First reference plate 14a and second reference plate 14b are disposed to face inside of main unit 2, in other words, to face scanner unit 11.

Figure 3:
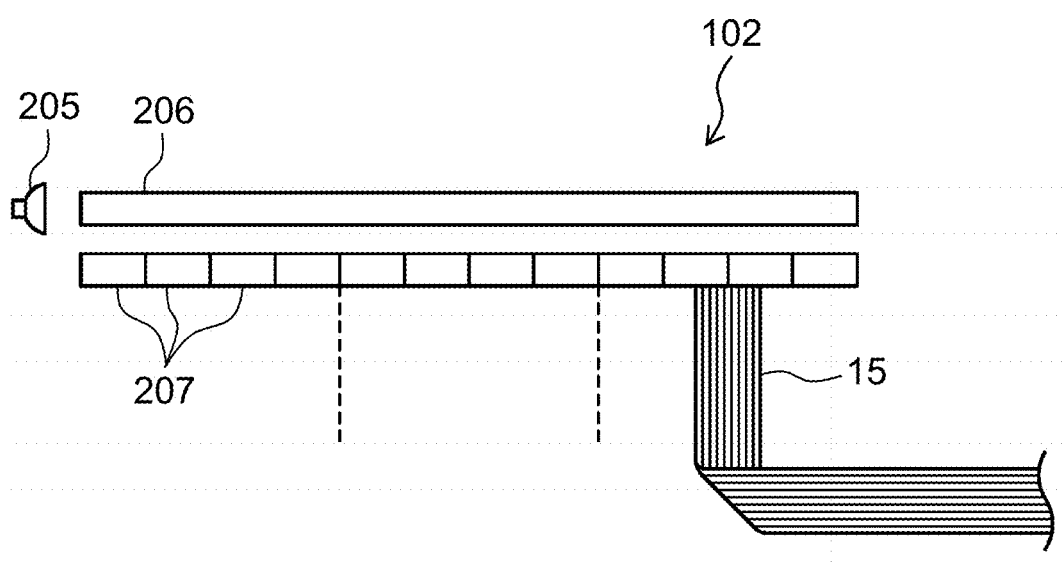
FIG. 3 is a schematic diagram of a sensor module in the first exemplary embodiment.

FIG. 3 is a schematic diagram of sensor module 102 in the first exemplary embodiment. Sensor module 102 is of the contact image sensor type in the present exemplary embodiment, namely, the CIS type. Sensor module 102 has light source 205 and a plurality of sensors 207.

The plurality of sensors 207 is arranged in the main scanning direction perpendicular to the sub-scanning direction. Typically, sensors 207 are sensor ICs such as CMOS image sensors. One of sensors 207 includes a plurality of pixels (photoelectric convertors) arranged in the main scanning direction. A rod lens array (not shown) is provided above sensors 207. Light converged by the rod lens array enters sensors 207.

The plurality of sensors 207 are divided into a plurality of sectors. The received light is converted into image signals, and the converted image signals are output from the sectors, respectively. That is, the sector is a group of sensors 207 that output the image signals in a group. For example, when the number of sensors 207 is 12 and sensors 207 are divided into three sectors, each sector includes four sensors 207. Sensors 207 output the image signals to controller 100 through FFC 15.

Light source 205 is typically an LED (Light Emitting Diode). For example, light source 205 is made up of three LEDs of red (R), green (G), and blue (B). Light source 205 is disposed on one end (the left end in FIG. 3) of sensor module 102, in the main scanning direction. Sensor module 102 has light guide 206. The light from light source 205 is emitted upward through light guide 206, concretely speaking, toward FB glass 12, ADF glass 13, or first reference plate 14a, and second reference plate 14b. Light source 205 and light guide 206 are disposed near sensors 207. Therefore, the light reflected from the document on FB glass 12 or ADF glass 13 or reflected from first reference plate 14a and second reference plate 14b enters sensors 207 through the rod lens array.

Figure 4:
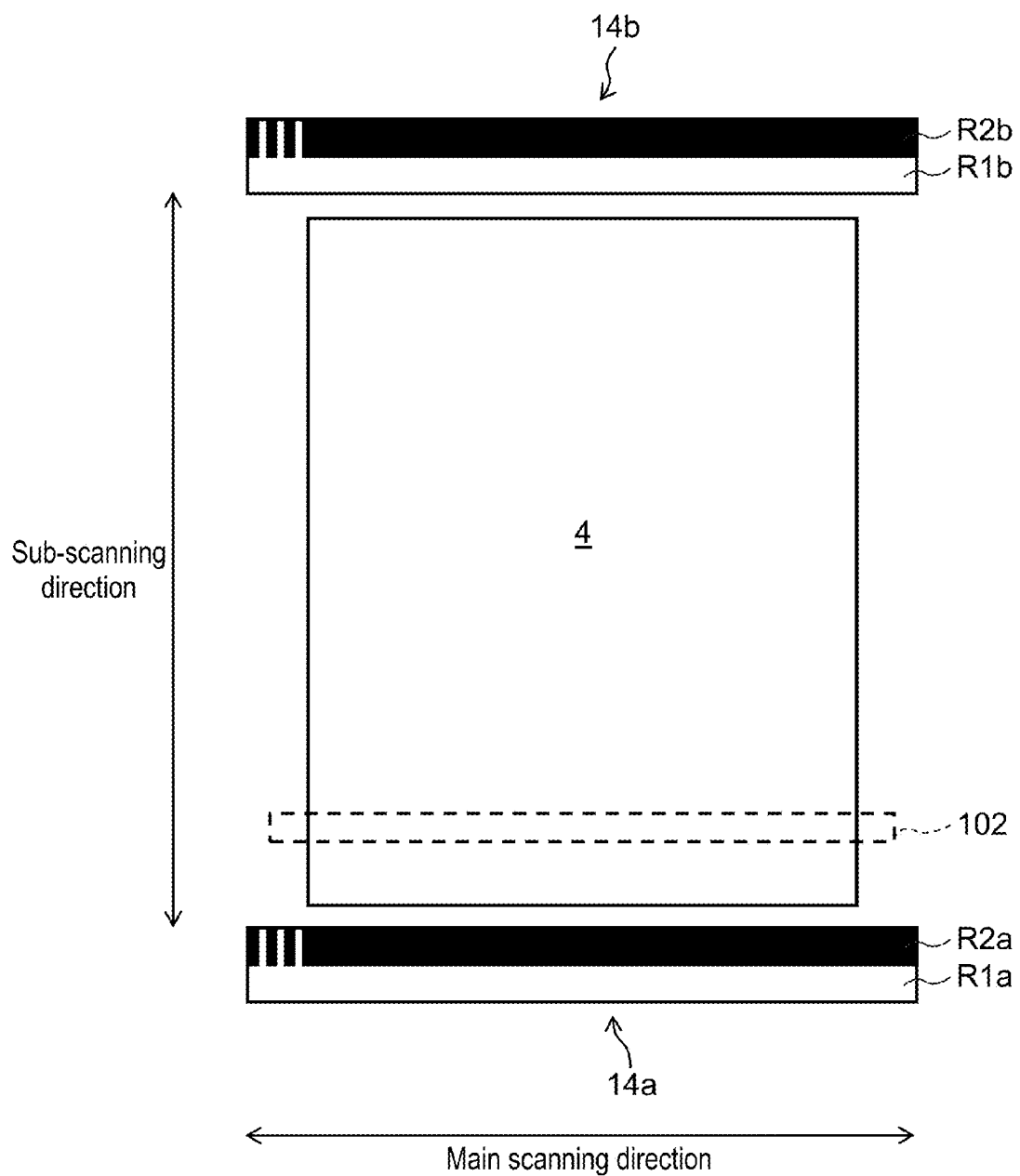
FIG. 4 is a diagram illustrating a disposition of a first reference plate and a second reference plate in the first exemplary embodiment.

FIG. 4 is a diagram illustrating a disposition of first reference plate 14a and second reference plate 14b. First reference plate 14a and second reference plate 14b are disposed at an interval in the sub-scanning direction.

Specifically, first reference plate 14a is disposed on a position more outward than one end of document placing region 4 in the sub-scanning direction. Further, second reference plate 14b is disposed on a position more outward than the other end of document placing region 4 in the sub-scanning direction. First reference plate 14a and second reference plate 14b extend in the main scanning direction. First reference plate 14a and second reference plate 14b are longer in a length in the main scanning direction at least than sensor module 102 (more specifically, sensors 207). First reference plate 14a has white region R1a and black region R2a, and second reference plate 14b has white region R1b and black region R2b. These white regions and black regions are disposed at least on surfaces facing sensor module 102 so as to extend over a whole length of sensor module 102 in the main scanning direction. Light reflectance of white region R1a and white region R1b is substantially 100%. Further, first reference plate 14a and second reference plate 14b are provided with reference patterns indicating home positions on sides more outward than black region R2a and black region R2b in the main scanning direction, respectively. As the reference pattern, any pattern can be employed as long as image processor 204 can identify the pattern. For example, the reference pattern may be a plurality of black lines that is arranged in the main scanning direction and extends in the sub-scanning direction. First reference plate 14a and second reference plate 14b are examples of the first reference member and second reference member. Further, the position of first reference plate 14a is an example of a first position, and the position of second reference plate 14b is an example of second position.

[1-2. Image Reading Device]

Figure 5:
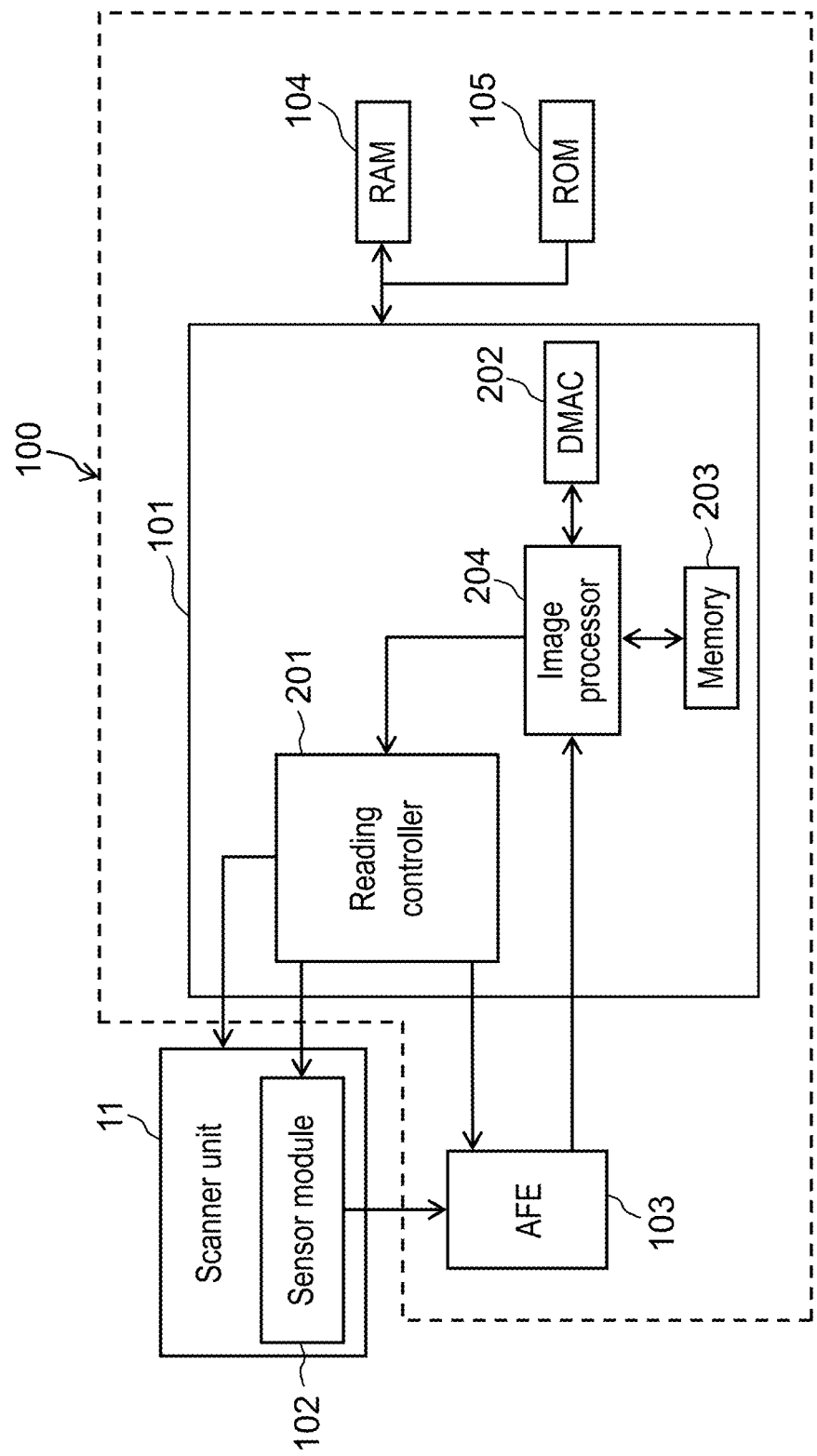
FIG. 5 is a block diagram of an image reading device in the first exemplary embodiment.

FIG. 5 is a block diagram of image reading device 10 in the first exemplary embodiment. As shown in FIG. 5, image reading device 10 includes scanner unit 11 and controller 100.

Controller 100 controls an image reading operation of scanner unit 11 and performs image processing on the image signal being output from scanner unit 11. Controller 100 has CPU 101, AFE (Analog Front End Circuit) 103, RAM (Random Access Memory) 104, and ROM (Read Only Memory) 105.

The image signal (analog signal) is input to AFE 103 from sensor module 102 of scanner unit 11. AFE 103 has an analog-to-digital converter, an amplifier, and the like. AFE 103 amplifies the image signal from sensor module 102 through the amplifier, adds or subtracts an offset to or from the amplified image signal, converts the signal into a digital signal (image data) through the analog-to-digital converter, and outputs the digital signal to CPU 101.

RAM 104 stores the image data acquired by CPU 101. ROM 105 stores a predetermined program necessary to the image processing on CPU 101. CPU 101 has reading controller 201, DMAC (Direct Memory Access Controller) 202, memory 203, and image processor 204.

Reading controller 201 controls operations of scanner unit 11 (including sensor module 102), ADF 16, and AFE 103. For example, reading controller 201 controls driving of the motor (not shown) for conveying document S set on ADF 16.

Image processor 204 performs the image processing on the image signal being input from AFE 103. Image processor 204 performs the image processing by reading out the program stored in ROM 105 and by executing the read-out program. Although a detailed description will be given later, image processor 204 performs various kinds of image processing such as a filtering process and a shading correction process. Image processor 204 is an example of the data generator and an example of the corrector.

DMAC 202 performs a data transfer process that transfers the image signal acquired by the image processing performed by image processor 204.

Memory 203 stores various data. For example, memory 203 stores the data to be used for the shading correction.

[1-3. Operations]

[1-3-1. Image Reading Operation]

Figure 6:
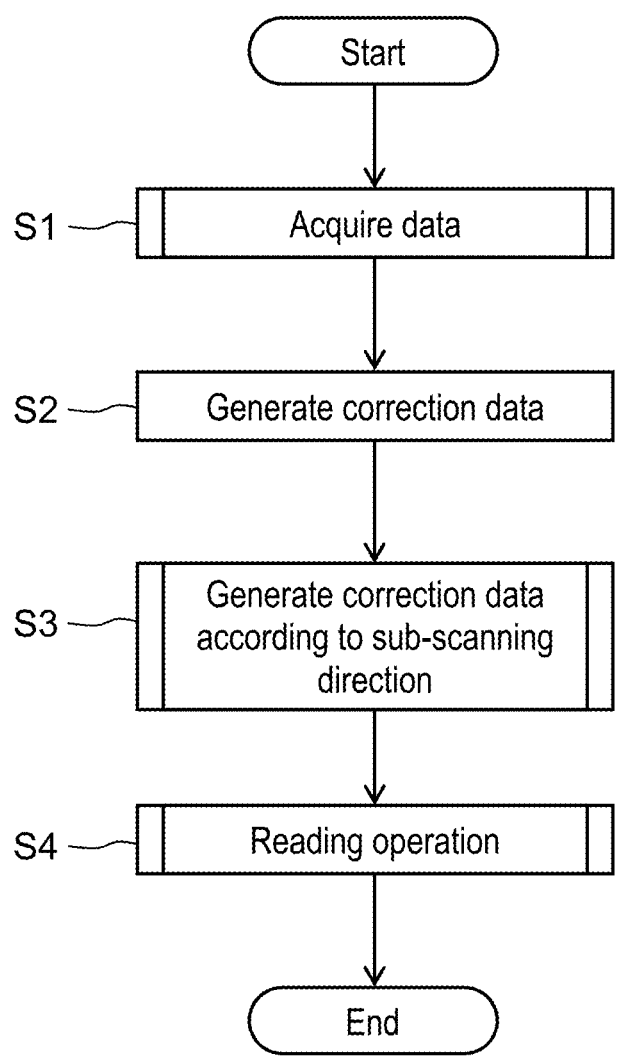
FIG. 6 is a flowchart of an image reading operation of the image reading device in the first exemplary embodiment.

The image reading operation will be described. FIG. 6 is a flowchart of the image reading operation of image reading device 10.

The image reading operation starts when a power source of image reading device 10 is turned on and an operation of a user is then received. First, image processor 204 acquires the data for generating first correction data and second correction data to be used for the shading correction using first reference plate 14a and second reference plate 14b at step S1. At step S2, image processor 204 generates the first correction data and the second correction data based on the data acquired at step S1. Thereafter, at step S3, image processor 204 generates correction data according to respective positions in the sub-scanning direction other than the first position and the second position based on the first correction data and the second correction data generated at step S2. After the generation of these correction data is completed, image processor 204 reads the document at step S4. At this time, image processor 204 performs the shading correction on the read-out image signal using the correction data.

[1-3-2. Data Acquisition Process]

Figure 7:
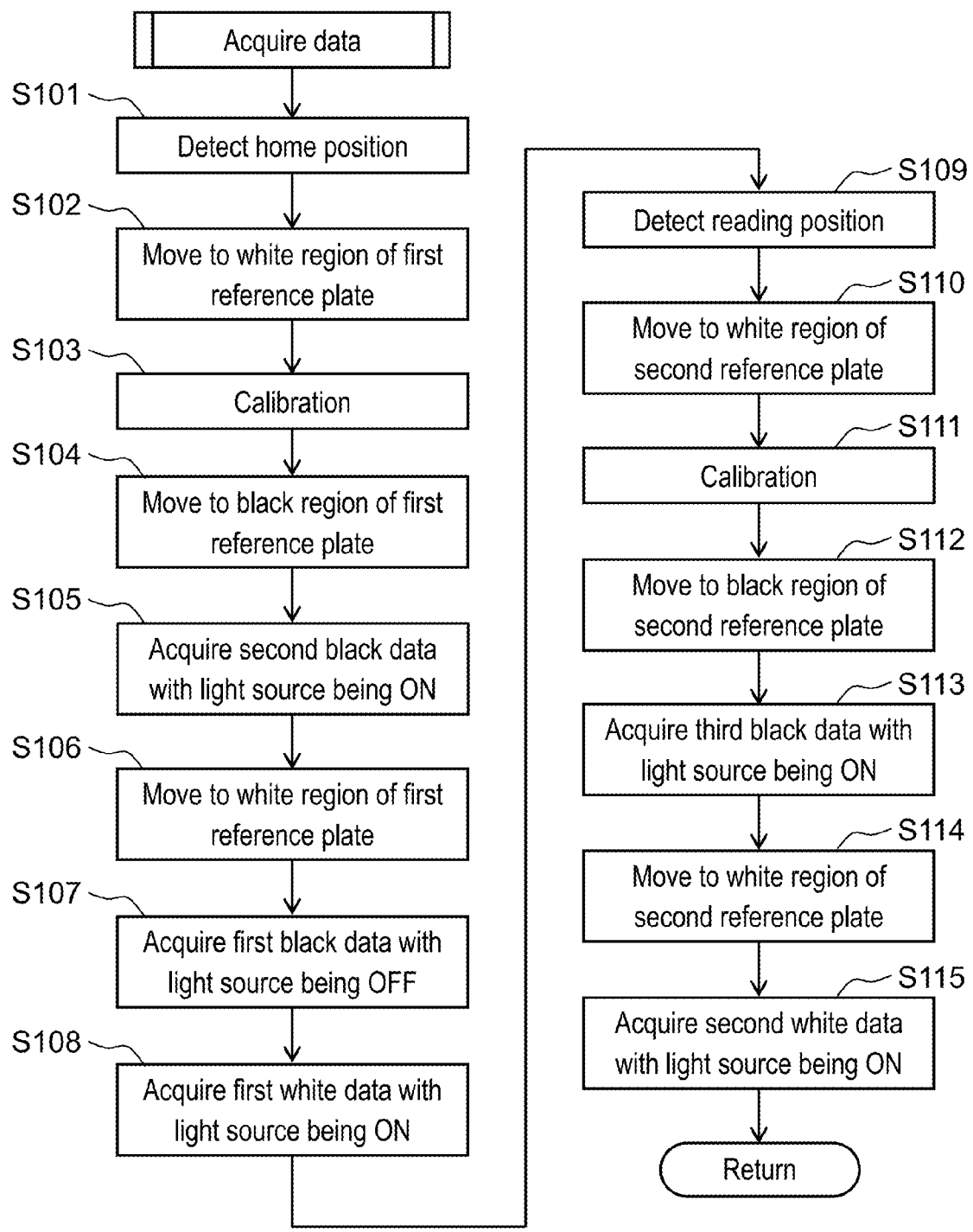
FIG. 7 is a flowchart of a data acquisition process of the image reading device in the first exemplary embodiment.

FIG. 7 is a flowchart of a data acquisition process of image reading device 10 in the first exemplary embodiment.

The process of data acquisition is started upon the operation for the data acquisition performed by the user through an operation unit (not shown) of image reading device 10.

First, image processor 204 detects the home position of sensor module 102 at step S101. Specifically, image processor 204 causes sensor module 102 to move to the home position stored in memory 203 through reading controller 201. This position is a temporary home position. Image processor 204, then, causes sensor module 102 to acquire an image at the home position and determines whether the reference pattern of first reference plate 14a is detected from the acquired image. When the reference pattern is detected, image processor 204 determines that the current position of sensor module 102 is precisely at the home position. When the reference pattern is not detected, image processor 204 causes sensor module 102 to move by a predetermined amount to one side in the sub-scanning direction and to acquire an image at that position, and determines whether the reference pattern is detected from the acquired image. Image processor 204 repeats this process until the reference pattern is detected. However, if the reference pattern is not detected even when sensor module 102 is moved toward the one side in the sub-scanning direction from the temporary home position by a certain distance, image processor 204 returns sensor module 102 back to the temporary home position and causes sensor module 102 to move toward the other side in the sub-scanning direction and to repeat the above-described process. Image processor 204 continues to make sensor module 102 move toward the other side in the sub-scanning direction until the reference pattern is detected. When the reference pattern is detected, image processor 204 finishes detecting the home position. Image processor 204 stores the detected position of the home position in memory 203, and at the next detection of the home position, image processor 204 uses the home position, which is stored in memory 203, as the temporary home position.

Next, at step S102, image processor 204 causes sensor module 102 to move to the position facing white region Ma of first reference plate 14a through reading controller 201. Since the distance in the sub-scanning direction between the reference pattern and white region R1a is known, image processor 204 can cause sensor module 102 to move accurately to the position facing white region R1a based on the home position detected at step S102.

When sensor module 102 moves to the position facing white region R1a, image processor 204 performs calibration at step S103. For example, image processor 204 performs initial setting such as the setting of a lighting time of light source 205 and the setting of AFE 103. Output levels of the image signals being output from the plurality of sensors 207 can be equalized by setting the lighting time of light source 205.

When the calibration is completed, at step S104, image processor 204 causes sensor module 102 to move to the position facing black region R2a of first reference plate 14a through reading controller 201 based on the detected home position.

At step S105, image processor 204 makes light source 205 irradiate black region R2a (the light source is ON), and acquires the image of black region R2a. That is, image processor 204 receives light reflected from black region R2a so as to convert the received light into an image signal. At this time, although an object is black, image processor 204 receives the light that is emitted from light source 205 and reflected from black region R2a. For this reason, the image signal at this time does not represent an output level of sensor 207 of a black color that is at a highest density level in the first position, but represents an output level of sensor 207 of a color close to black at a comparatively high density level. Image data of a color close to black at a comparatively high density level is so-called intermediate data. Image processor 204 stores this image data as second black data in memory 203. The second black data is an example of the intermediate data in the first position.

When acquisition of the second black data is completed, at step 5106, image processor 204 causes sensor module 102 to again move to the position facing white region R1a of first reference plate 14a through reading controller 201.

At step S107, image processor 204, then, acquires the image with light source 205 being turned off (the light source being OFF). In this case, since light source 205 is off, at least the light, which is emitted from light source 205 and reflected from the object, does not enter sensors 207. Therefore, the image data at this time represents the output level of sensors 207 of black that is at the highest density level in the first position. This image data is so-called black data.

Image processor 204 stores the image data as first black data in memory 203. The first black data is an example of the black data.

At step S108, image processor 204 acquires the image with light source 205 turned on (the light source being ON). Sensor module 102 at this time faces white region R1a of first reference plate 14a. Therefore, sensor module 102 acquires an image of white region R1a. Since the reflectance of white region R1a is substantially 100%, the image data based on the image signal at this time, namely, the white data represents an output level of sensors 207 of white at a lowest density level in the first position. Image processor 204 stores the white data as first white correction data in memory 203.

Next, at step S109, image processor 204 causes sensor module 102 to move to the second position through reading controller 201 and to detect a reading position of second reference plate 14b. Specifically, similarly to the detection of the home position at step S101, sensor module 102 is moved to the detection position stored in memory 203, and sensor module 102 is caused to acquire an image in this position. When the reference pattern is detected from the image, image processor 204 determines that the current position of sensor module 102 is precisely the reading position. Further, when the reference pattern is not detected, image processor 204 repeats the movement and image acquisition of sensor module 102 until the reference pattern is detected.

When the detection of the reading position is completed, at step S110, image processor 204 causes sensor module 102 to move to the position facing white region R1b of second reference plate 14b through reading controller 201.

At step S111, image processor 204 performs the calibration so as to perform setting such as the setting of a lighting time of light source 205 and the setting of AFE 103.

When the calibration is completed, at step S112, image processor 204 causes sensor module 102 to move to the position facing black region R2b of second reference plate 14b through reading controller 201. At the moving time, the position of sensor module 102 may be decided by detecting the reference pattern of second reference plate 14b.

At step S113, image processor 204 makes light source 205 irradiate black region R2a (the light source is ON) through reading controller 201, and acquires the image of black region R2a. The image data based on the image signal at this time represents the output level of sensors 207 of a color close to black at a comparatively high density level in the second position. Image processor 204 stores the acquired image data as third black data in memory 203. The third black data is an example of the intermediate data in the second position.

When acquisition of the third black data is completed, at step S114, image processor 204 causes sensor module 102 to move to the position facing white region R1b of second reference plate 14b through reading controller 201.

At step S115, image processor 204, then, makes light source 205 irradiate white region R1b through reading controller 201 (the light source is ON), and acquires the image of white region R1b. The image data based on the image signal at this time, namely, the white data represents an output level of sensors 207 of white at the lowest density level in the second position.

Image processor 204 stores the white data as second white correction data in memory 203.

[1-3-3. Generation of Correction Data in First Position and Second Position]

Image processor 204 generates first black correction data and second black correction data as black references for the shading correction in the main scanning direction based on the first black data, second black data and third black data acquired by the data acquisition process. An influence of density unevenness caused by crosstalk in the main scanning direction to be described later can be reduced by generating the first black correction data and the second black correction data using the first black data, the second black data and the third black data.

A noise is occasionally generated on the image signals when the image signals from the plurality of sensors 207 interfere with each other on a transmission path of the image signals (crosstalk) In particular, in the configuration in which the image signals are output through FFC 15 as in the case of sensors 207, crosstalk is likely to be generated due to bending of FFC 15.

Figure 8:
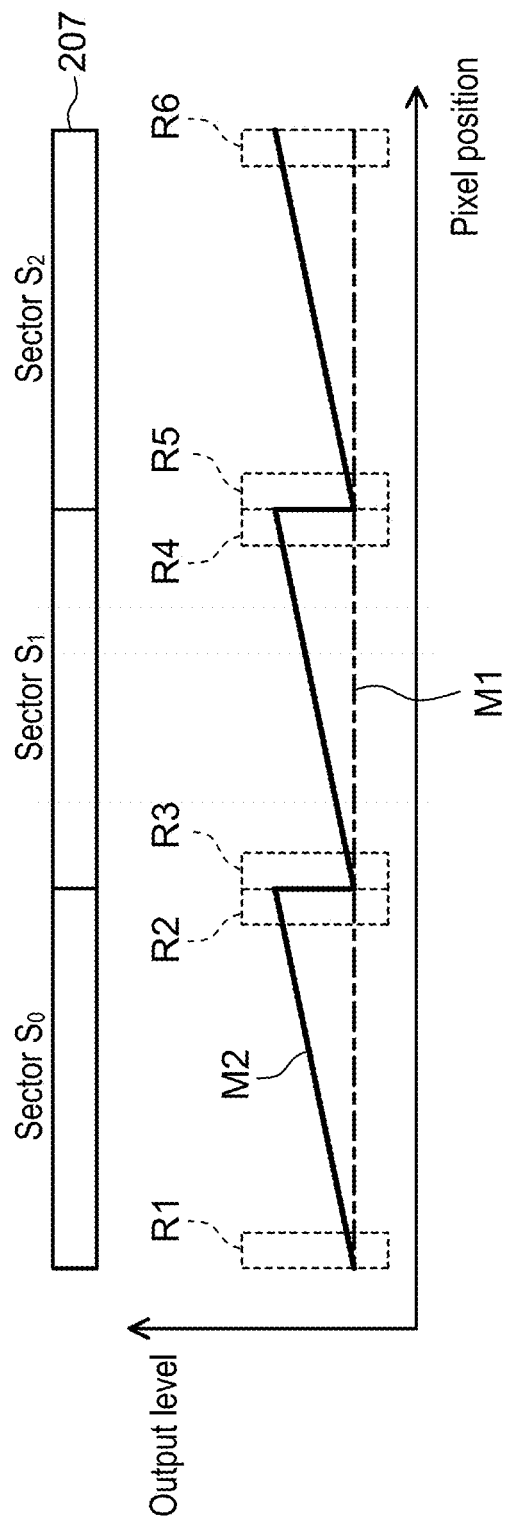
FIG. 8 is a diagram illustrating an example of an output level of a sensor.

FIG. 8 is a diagram illustrating an example of an output level of sensor 207. In FIG. 8, alternate long and short dash line M1 represents a case where no crosstalk occurs, and solid line M2 represents a case where crosstalk occurs. The vertical axis in FIG. 8 represents the output level of sensor 207, and the horizontal axis represents the position of the pixels of the sensor 207 in the main scanning direction. For example, when an object with uniform reflectance is imaged and no crosstalk occurs, the output level of each pixel is substantially constant as represented by alternate long and short dash line M1 in FIG. 8 if the pixels are assumed to have no individual differences between pixels. However, when crosstalk occurs, the output level of each pixel changes in each sector as represented by solid line M2 in FIG. 8. For example, as shown in FIG. 8, the output level of each pixel in each sector increases linearly from one end toward the other end of each sector. Further, when the output level is different in each pixels in each sector, a step is generated in the output level at a part where each sector changes.

Figure 9C:
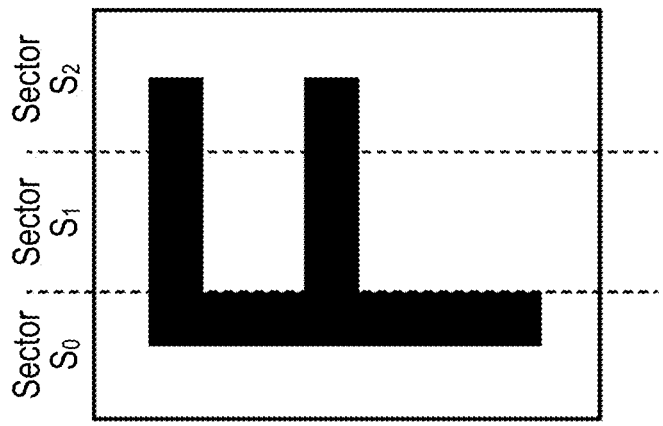
FIG. 9C is a diagram illustrating a read image on which shading correction has been performed.
Figure 9B:
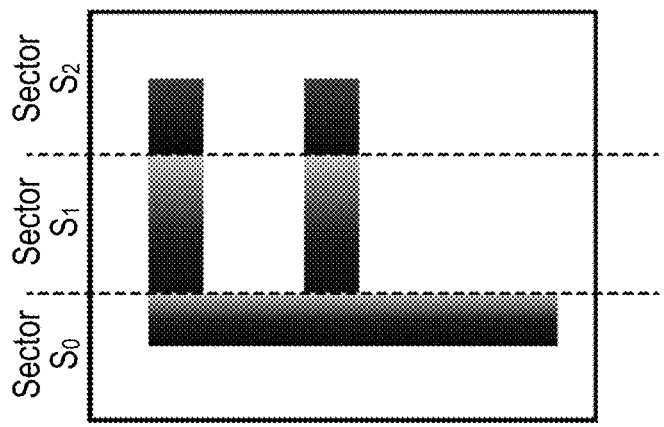
FIG. 9B is a diagram illustrating a read image on which conventional shading correction has been performed.
Figure 9A:
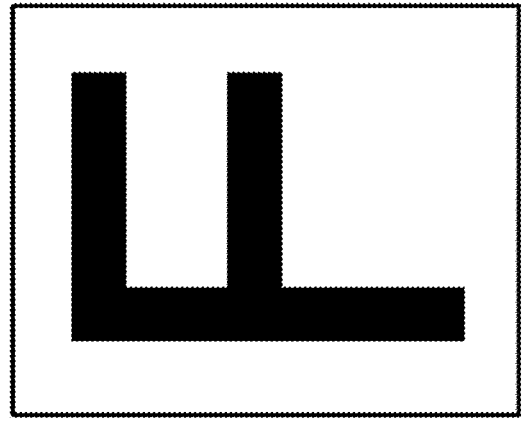
FIG. 9A is a diagram illustrating an image of a document.

FIG. 9A is a diagram illustrating an image of a document. FIG. 9B is a diagram illustrating a read image on which conventional shading correction has been performed. FIG. 9C is a diagram illustrating a read image on which shading correction has been performed.

FIG. 9A illustrates an example of the image of document S. FIG. 9B illustrates a read image on which conventional shading correction has been performed after an image of document S has been read. As shown in FIG. 9B, when a noise is generated due to crosstalk, density unevenness is generated in the read image. In the read image of FIG. 9B, density unevenness is generated at a part corresponding to a boundary between the sectors of sensor 207.

Figure 10:
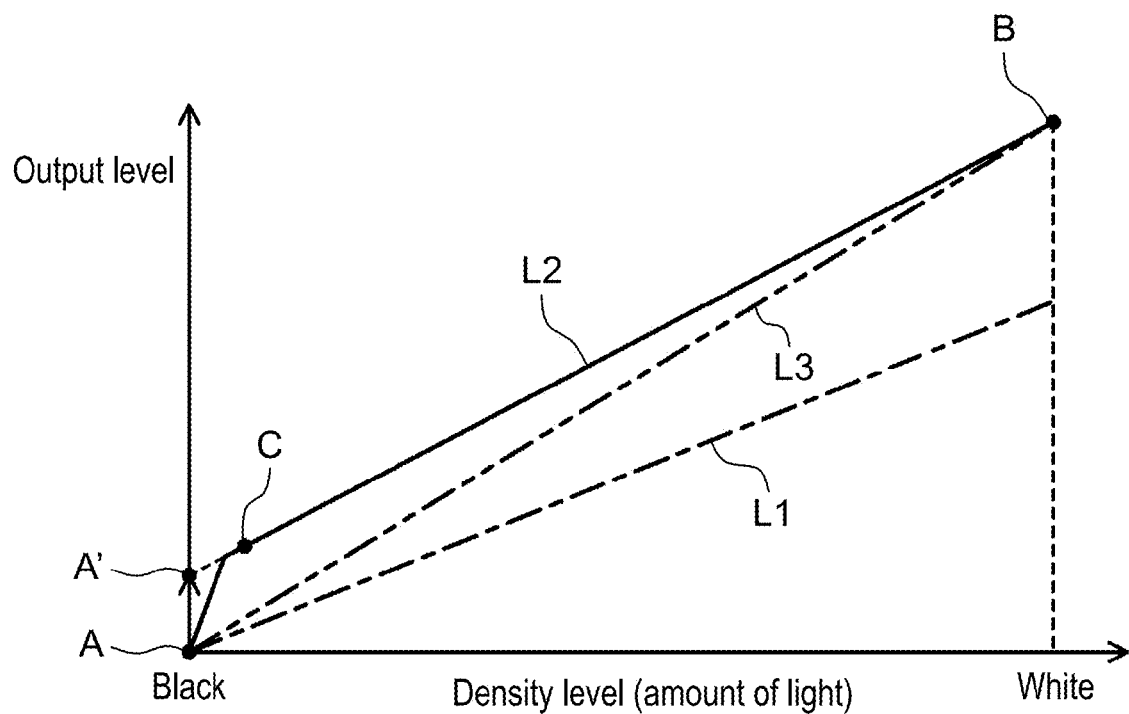
FIG. 10 is a graph illustrating a relationship of an output level with respect to a density level of a sensor.

Further, FIG. 10 is a graph illustrating a relationship of the output level of sensor 207 with respect to the density level. Each pixel of sensor 207 outputs a voltage signal according to an amount of light. A change in the voltage according to the amount of light depends on characteristics of sensor 207. For example, when the voltage changes linearly depending on the amount of light, the voltage ideally changes as shown by alternate long and short dash line L1. However, when a noise caused by crosstalk (hereinafter, referred to as an "interference noise") is superposed on the output signal, the voltage changes as shown by solid line L2. That is, since the output level of black at the highest density level is low, an interference noise hardly appears on the output signal. However, when the density level becomes a bit lower than black, the output level of sensor 207 increases, and the interference noise increases accordingly.

In the case of conventional typical shading correction, image data is acquired with light source 205 being off (point A), and the image data is used as the black correction data to be the black reference. The image data of white is acquired with light source 205 being on (point B), and the image data is used as the white correction data to be the white reference. An offset and a gain (dynamic range) of each pixel are corrected by performing the shading correction using the thus acquired black correction data and white correction data. However, an interference noise is not likely to affect the image signal acquired while light source 205 is off. For this reason, when the shading correction is performed by using the image data at point A and point B, the shading correction is performed based on the characteristic shown by alternate long and two short dashes line L3 different from the actual output characteristic of sensor 207. As a result, the shading correction cannot be appropriately performed.

Therefore, in image reading device 10 of the present disclosure, the first black correction data and second black correction data are generated by using the first black data acquired while light source 205 is off, the second black data and the third black data acquired while light source 205 is off.

Figure 11:
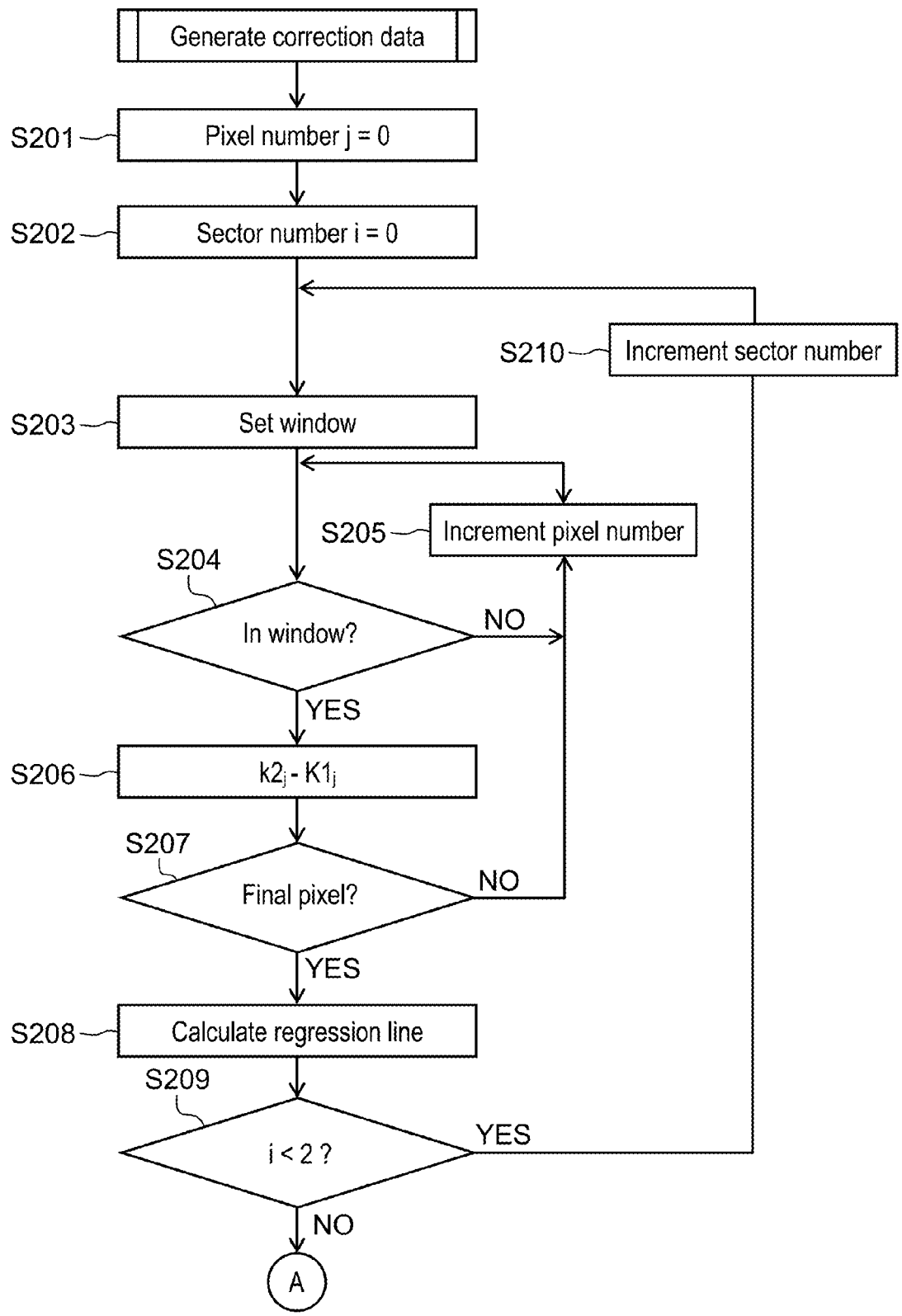
FIG. 11 is a flowchart of a front stage of a correction data generation process in the first exemplary embodiment.
Figure 12:
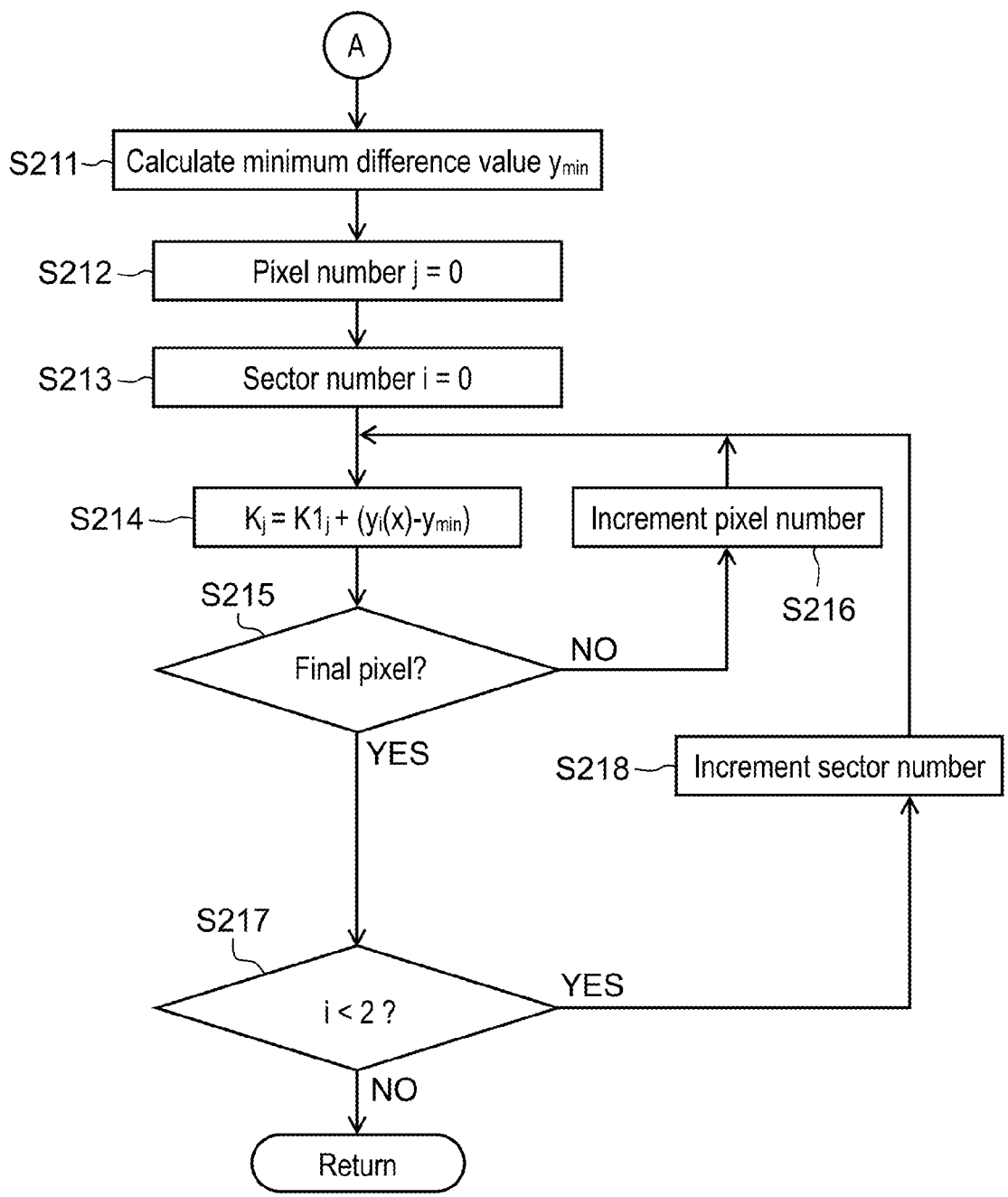
FIG. 12 is a flowchart of a rear stage of the correction data generation process in the first exemplary embodiment.
Figure 13:
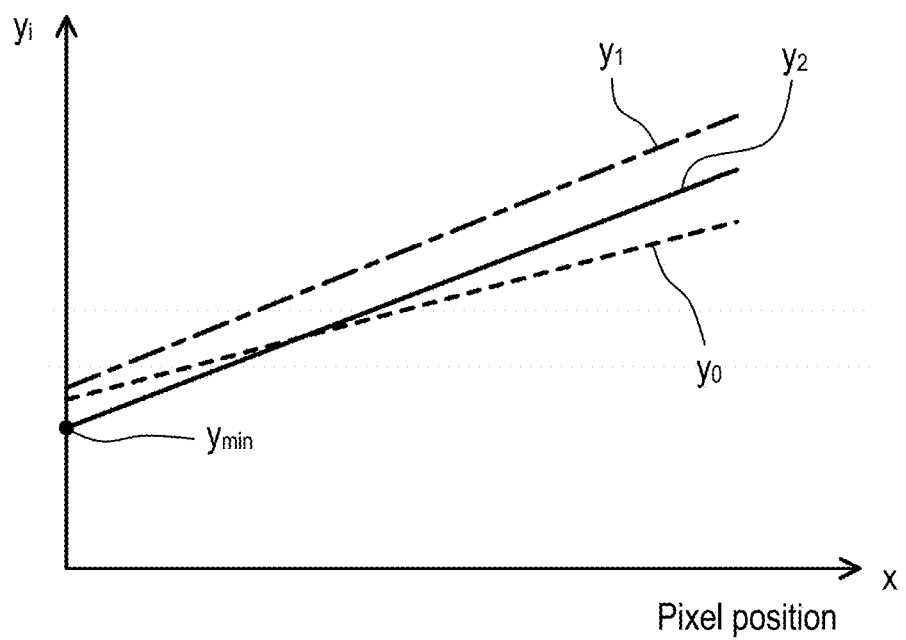
FIG. 13 is a diagram illustrating a regression line of a difference value in each sector.

FIG. 11 is a flowchart of a front stage of a correction data generation process of image reading device 10 in the first exemplary embodiment. FIG. 12 is a flowchart of a rear stage of the correction data generation process of image reading device 10 in the first exemplary embodiment. FIG. 13 is a diagram illustrating a regression line of difference values in the respective sectors. Since the second black correction data is generated according to a flow similar to the first black correction data, only the process for generating the first black data is described below.

In the following description, the number of sectors of sensor 207 is three, and the number of pixels in the main scanning direction is n. Further, the sector is represented by $S_i$ (i=0 to 2), and the pixel is represented by $X_j$ (j=0 to n−1). Sector $S_0$ is located on one end of sensor 207 in the main scanning direction, sector $S_1$ is next to sector $S_0$, and sector $S_2$ is next to sector $S_1$ and is located on the other end of sensor 207 in the main scanning direction. As for the pixels, pixel $X_0$ is on one end of sensor 207 in the main scanning direction, and the pixel having a larger pixel number j is closer to the other end in the main scanning direction, where pixel $X_{n-1}$ is on the other end of sensor 207 in the main scanning direction.

At step S201, image processor 204 sets the pixel number j to 0. Further, at step S202, image processor 204 sets sector number i to 0.

At step S203, image processor 204 then, sets areas (windows) in which difference values to be described later are calculated in the respective sectors. In detail, as illustrated in FIG. 8, windows are set at one ends and at the other ends in the respective sectors in the main scanning direction. A width of each window is set to include a predetermined number of pixels. In FIG. 8, in sector $S_0$, start window R1 and end window R2 are respectively set at one end and the other end in the main scanning direction. Similarly, in sector $S_1$, start window R3 and end window R4 are respectively set at one end and the other end in the main scanning direction. Further, in sector $S_2$, start window R5 and end window R6 are respectively set at one end and the other end in the main scanning direction.

At step S204, image processor 204 determines whether pixel $X_j$ is included in the window. For example, since the equation is such that j=0 just after step S201, pixel $X_j$ is included in start window R1 of sector $S_0$.

When the pixel $X_j$ is outside the window, image processor 204 increments the pixel number j at step S205 and performs the process of step S204 again. That is, image processor 204 determines whether the next pixel $X_j$ is included in the window.

On the other hand, when pixel $X_j$ is in the window, at step S206, image processor 204 calculates a difference value ($K2_j-K1_j$) between output level $K2_j$ of the second black data of pixel $X_j$ and output level $K1_j$ of the first black data of pixel $X_j$, and stores the calculated difference value in memory 203.

After that, at step S207, image processor 204 determines whether pixel $X_j$ is the final pixel in sector $S_i$. When pixel $X_j$ is not the final pixel, at step S205, image processor 204 increments the pixel number j, and performs the process of step S204 again.

On the other hand, when pixel $X_j$ is the final pixel, at step S208, image processor 204 calculates a regression line of the difference values in sector Si. Specifically, as illustrated in FIG. 13, image processor 204 calculates a regression line $y_i(x)=a_i \times x+b_i$ of the difference value of the pixel included in the start window in sector $S_i$ and the difference value of the pixel included in the end window, where x is the pixel position in the sector, $y_i$ is the difference value, i is a sector number, $a_i$ is a coefficient (inclination) of the regression line, and $b_i$ is a coefficient (constant term) of the regression line. Image processor 204 stores the calculated coefficients $a_i$, $b_i$ of the regression line in memory 203. In FIG. 13, dotted line $y_0$ represents the regression line in sector $S_0$, solid line $y_2$ represents the regression line in sector $S_1$, and alternate long and short dash line $y_3$ represents the regression line in sector $S_2$.

Next, at step S209, image processor 204 determines whether the sector number i is smaller than "2". When the sector number i is smaller than "2", at step S210, image processor 204 increments the sector number i, and performs the process of step S203 again. That is, unless sector $S_i$ in which the regression line has been calculated is the final sector (namely, sector $S_2$), image processor 204 changes sector $S_i$ to the next sector $S_{i+1}$ and repeats the calculation of the regression line.

On the other hand, when the sector number i is "2" or more, practically, when the sector number is 2, image processor 204 finishes the process of the front stage of generating the correction data.

Subsequently, image processor 204 performs the process of the rear stage of generating the correction data. In detail, as illustrated in FIG. 13, image processor 204 obtains, at step S211, the minimum difference value $y_{min}$ ($y_{min}=\min(y_i)$) in the three regression lines $y_0$ to $y_2$ of sector $S_0$, sector $S_1$, and sector $S_2$ stored in memory 203. That is, the minimum difference value $y_{min}$ is the smallest minimum value in the three sectors. The smallest minimum value is included in the minimum values in the regression line of each sector.

Image processor 204, then, sets the pixel number j to 0 at step S212. Subsequently, image processor 204 sets the sector number i to 0 at step S213.

Then, at step S214, image processor 204 corrects the output level $K1_j$ of pixel $X_j$ of the first black data using the minimum difference value $y_{min}$, and thus acquires the first black correction data. Specifically, the correction value $K_j$ for pixel $X_j$ of the first black correction data is expressed by the following equation.

$$K_j=K1_j+(y_i(x)-y_{min})$$

Next, image processor 204 determines at step S215 whether pixel $X_j$ is the final pixel in sector $S_i$. When pixel $X_j$ is not the final pixel, at step S216, image processor 204 increments the pixel number j, and performs the process of step S214 again.

On the other hand, at step S217, when pixel $X_j$ is the final pixel, image processor 204 determines whether the sector number i is smaller than "2". When the sector number i is smaller than "2", at step S218, image processor 204 increments the sector number i, and performs the process of step S214 again. That is, unless sector $S_i$ in which the black correction data has been calculated is the final sector (namely, sector $S_2$), image processor 204 changes sector $S_i$ to the next sector $S_{i+1}$ and repeats the calculation of the black correction data.

On the other hand, when the sector number i is "2" or more, practically, when the sector number is 2, image processor 204 finishes the process of the rear stage of generating the correction data.

As described above, image processor 204 adds the value obtained by subtracting the minimum difference value $y_{min}$ from the difference value $y_i(x)$ of each sector to the output level $K1_j$ of the first black data so as to obtain the correction value $K_j$ of the black correction data.

[1-3-4. Generation of Correction Data According to Each Position in Sub-Scanning Direction]

Calculation of the black correction data and the white correction data according to respective positions in the sub-scanning direction other than the first position and the second position is described.

In the configuration in which the image signals are output through FFC 15, crosstalk is likely to be generated due to bending of FFC 15. As illustrated in FIG. 2, when scanner unit 11 is located around a reading start position such as the first position (a position of first reference plate 14a), most part of FFC 15 is overlapped. As scanner unit 11 moves from the first position along the sub-scanning direction, the overlapped portion of FFC 15 reduces more. When scanner unit 11 is located around a reading end position such as the second position (a position of second reference plate 14b), FFC 15 almost fully stretches, and thus the overlapped portion is small. When such overlapping of FFC 15 fluctuates, a volume of the interference noise caused by bending of FFC 15 also fluctuates.

Figure 14:
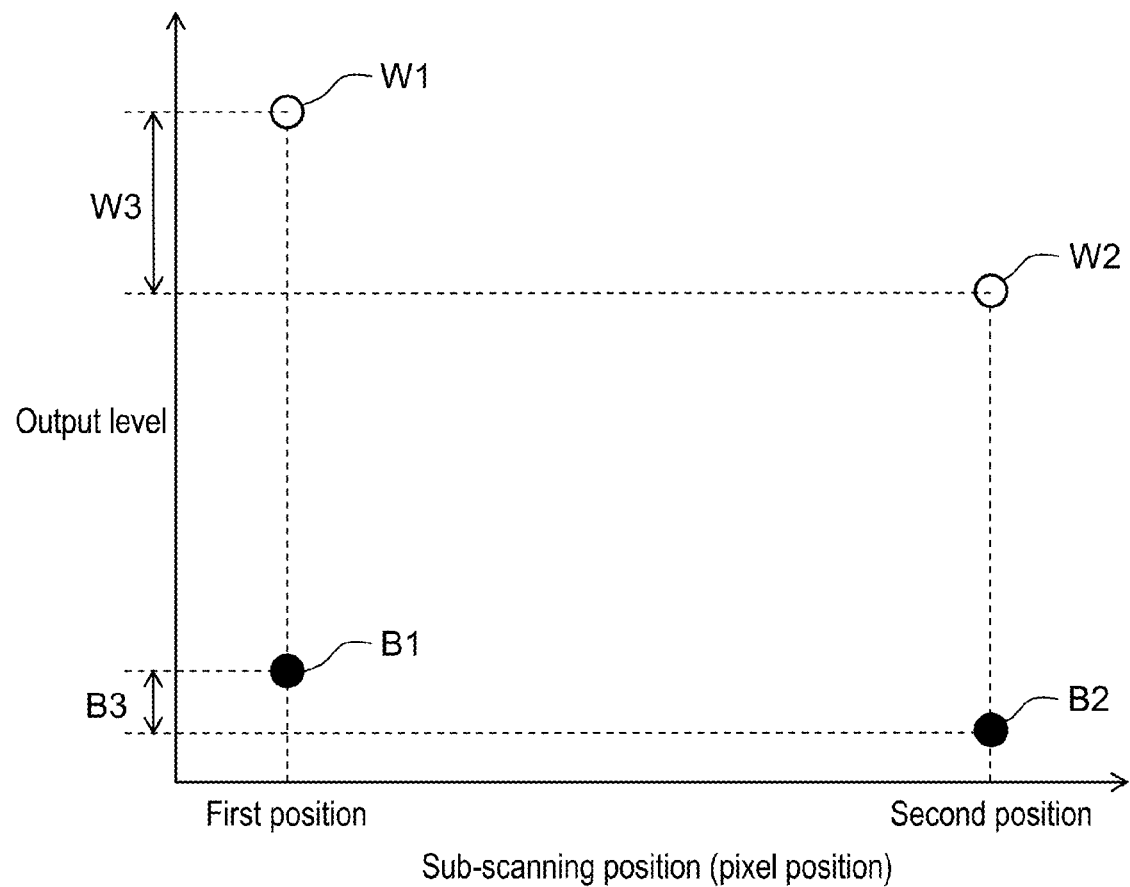
FIG. 14 is a graph illustrating a relationship of an output level of a sensor with respect to a position in a sub-scanning direction.

FIG. 14 is a graph illustrating a typical output level of sensor 207 with respect to a position in the sub-scanning direction. In FIG. 14, the first position corresponds to the first position in this exemplary embodiment, and the second position corresponds to the second position in this exemplary embodiment. Further, filled circles in the drawing represent output levels of black, and white circles represent output levels of white. B1 represents the output level of black obtained in the first position, and B2 represents the output level of black obtained in the second position. Further, W1 represents the output level of white obtained in the first position, and W2 represents the output level of white obtained in the second position.

The output levels of the image signals obtained in the respective positions include interference noises. However since the overlapping state of FFC 15 varies in the respective positions, the volume of the interference noise varies. For this reason, the output level fluctuates according to positions in the sub-scanning direction. At this time, since the interference noise included in the output level of white is great, an influence due to the fluctuation in the interference noise becomes great. That is, the output level of white fluctuates more greatly than the output level of black. As a result, a difference between the output level of white and the output level of black fluctuates in the first position and the second position. In a case of FIG. 14, it is found that the difference W3 between white levels W1 and W2 is larger than the difference B3 between the black levels B1 and B2.

For this reason, when the shading correction is performed on the image data in the second position using the correction data in the first position, gradation does not match between the correction data and the image data, and thus density unevenness of the image illustrated in FIG. 9B is generated also in the sub-scanning direction.

Therefore, in image reading device 10 of the present disclosure, correction data are acquired also for the respective positions in the sub-scanning direction other than the first position and the second position using the first correction data and the second correction data. These correction data are acquired according to the respective positions in the sub-scanning direction. The shading correction is performed by using the correction data. FIG. 14 illustrates a case where the output level in the first position becomes lower than the output level in the second position. However, the output level in the second position occasionally becomes higher than the output level in the first position due to a constitution, an environment variable or the like of the device.

In the following description, the number of pixels in the sub-scanning direction is m, and the pixels are represented by $X_l(l=0\sim m-1)$. As for the pixels, pixel $X_0$ is on one end of sensor 207 in the sub-scanning direction, and the pixel having a larger pixel number l is closer to the other end in the sub-scanning direction, where pixel $X_{m-1}$ is on the other end of sensor 207 in the sub-scanning direction. In the following description, $X_0$ corresponds to the pixel on one end of first reference plate 14a in the sub-scanning direction, and $X_{m-1}$ corresponds to the pixel on one end of second reference plate 14b in the sub-scanning direction.

First, image processor 204 calculates a regression line $y=c_K \times x+d_K$ of pixel $X_l$ in the sub-scanning direction with respect to the first black correction data and the second black correction data, where x is the pixel position of pixel $X_l$, y is the correction data of pixel $X_l$, $c_K$ is a coefficient (an inclination) of the regression line, and $d_K$ is a coefficient (a constant term) of the regression line. Image processor 204 stores the calculated coefficients $c_k$ and $d_k$ of the regression line in memory 203.

Image processor 204 calculates a regression line $y=c_S \times x+d_S$ similarly with respect to the first black correction data and the second black correction data, where x is the pixel position of pixel $X_l$, y is the correction data of pixel $X_l$, $c_S$ is a coefficient (an inclination) of the regression line, and $d_S$ is a coefficient (a constant term) of the regression line. Image processor 204 stores the calculated coefficients $c_S$ and $d_S$ of the regression line in memory 203.

In such a manner, image processor 204 performs linear interpolation on the correction data according to respective positions in the sub-scanning direction other than the first position and the second position based on the correction data in the first position and the second position. Image processor 204 performs the shading correction using the calculated black correction data and white correction data according to the respective positions in the sub-scanning direction.

[1-3-5. Reading Process]

When the black correction data and the white correction data have been calculated according to the respective positions in the sub-scanning direction, image processor 204 executes a reading process. Specifically, image processor 204 causes sensor module 102 to move and execute the reading process on the image of document S through reading controller 201. Image processor 204 performs the shading correction on the read image using the black correction data and the white correction data.

The shading correction in the main scanning direction is performed with respect to the respective positions in the sub-scanning direction by using the black correction data according to the sub-scanning direction and the white correction data according to the sub-scanning direction. As a result, the influence of the density unevenness of the image in the main scanning direction and the sub-scanning direction caused by crosstalk can be reduced.

Specifically, since the first black data acquired at step S107 has a very low output level, the interference noise included in the first black data is also very small (see point A in FIG. 10). On the other hand, since the second black data is on a side lower in a density level than the first black data and the output level is high, an interference noise appears on the second black data (see point C in FIG. 10). The first black data is corrected by using the second black data, so that the black correction data containing an interference noise can be generated.

Since the second black data is an image signal of black region R2a of first reference plate 14a although light source 205 is on, an output caused by the reflection light from black region R2a is minimal in the outputs of the second black data, and most part of the output is an interference noise. Further, since the density of black region R2a irradiated with light is extremely close to black, an output caused by the reflection light from black region R2a is slightly larger than an output of the first black data but is rarely different. Therefore, the difference value $(K2_j-K1_j)$ between the output level of the second black data and the output level of the first black data can be regarded as approximately the interference noise. In the present disclosure, the difference value $(K2_j-K1_j)$ is linear-regressed, and the offset of the difference value $(K2_j-K1_j)$ in each sector is corrected. However, in principle, the black correction data containing the interference noise is generated by adding the difference value $(K2_j-K1_j)$ to the first black data. That is, the data at point A' in FIG. 10 is generated.

Further, the black correction data and the white correction data according to respective positions in the sub-scanning direction other than the first position and the second position can be acquired by using the acquired first black correction data, the second black correction data, the first white correction data, and the second white correction data. The black correction data according to the respective positions in the sub-scanning direction other than the first position and the second position are calculated by linear interpolation using the first black correction data and the second black correction data. On the other hand, the white correction data is calculated by linear interpolation using the first white correction data and the second white correction data.

The shading correction is performed by using the black correction data (point A' in FIG. 10), which contains the interference noise and where a fluctuation of the interference noise in the sub-scanning direction is taken into consideration, and the white correction data (point B in FIG. 10), where a fluctuation of the interference noise in the sub-scanning direction is taken into consideration. As a result, the shading correction can be performed according to the actual output from sensor 207 containing the interference noises in both the main scanning direction and the sub-scanning direction.

When image processor 204 successively reads images of a plurality of documents S, the third black data and the second white data are acquired once by using second reference plate 14b before the sequential reading of the images of the plurality of documents S is started. The first black data, the second black data, and the first white data are acquired every time before reading an image of each document S. Then, the shading correction of the image data of each document S is performed after the black correction data and the white correction data associated with each positions in the sub-scanning direction are generated based on the third black data and the second white data once acquired before the whole reading, and the first black data, the second black data and the first white data acquired every time before each reading.

[1-4. Conclusion]

Image reading device 10 includes sensor module 102 and image processor 204. Sensor module 102 has light source 205 for irradiating an object and a plurality of sensors 207 for reading light reflected from the object to acquire image signals. Image processor 204 generates black correction data to be a black reference in the shading correction and white correction data to be a white reference, and performs the shading correction on the image signals acquired by the plurality of sensors 207 using the black correction data and the white correction data.

The plurality of sensors 207 is disposed in the main scanning direction, and the image signals of the sensors constitute an image signal on a line extending in the main scanning direction.

Image processor 204 generates the black correction data based on intermediate data which is lower in a density level than the black reference and is higher than the white reference.

Image processor 204 acquires the second black data that is the intermediate data in the first position based on the image signal of first reference plate 14a disposed in the first position and extending in the main scanning direction, and generates the first black correction data that is the black correction data in the first position based on the second black data.

Image processor 204, then, acquires the third black data that is the intermediate data in the second position based on the image signal of second reference plate 14b disposed in the second position different from the first position in the sub-scanning direction and extending in the main scanning direction, and generates the second black correction data that is black correction data in the second position based on the third black data.

Image processor 204, then, generates the black correction data according to the respective positions in the sub-scanning direction other than the first position and the second position based on the first black correction data and the second black correction data.

Image processor 204 performs the shading correction using the black correction data on the respective positions in the sub-scanning direction so as to correct density unevenness of an image in the main scanning direction and the sub-scanning direction. Such density unevenness is caused by an interference between the image signals from the plurality of sensors 207.

In this configuration, the second black data is acquired from the image signal of first reference plate 14a, the third black data is acquired from second reference plate 14b, the first black correction data is generated based on the second black data, and the second black correction data is generated based on the third black data. As a result, the first black correction data including the interference noise in main scanning direction in the first position, and the second black correction data including the interference noise in the main scanning direction in the second position can be acquired.

The black correction data where a fluctuation in the interference noise in the sub-scanning direction is considered can be calculated in the respective positions in the sub-scanning direction other than the first position and the second position based on the first black correction data and the second black correction data. The shading correction is performed by using the black correction data, formed in such a manner, in the respective positions in the sub-scanning direction. As a result, the density unevenness of the image in the main scanning direction and the sub-scanning direction, which is caused by an interference noise, can be corrected.

Further, first reference plate 14a and second reference plate 14b have black regions R2a, R2b, respectively.

Image processor 204 causes the plurality of sensors 207 to acquire image signals with light source 205 being off in the first position, and acquires the first black data from the image signals. Image processor 204, then, acquires the second black data based on the image signal on black region R2a of first reference plate 14a irradiated by light source 205, and generates the first black correction data based on the first black data and the second black data.

Image processor 204, then, generates the third black data in the second position based on the image signal of black region R2b of second reference plate 14b irradiated by light source 205, and generates the second black correction data based on the first black data and the third black data.

With this configuration, the first black data is the black data that is higher in the density level than the second black data and the third black data. However, since the density level of the first black data is high, the output level itself is low, and the contained interference noise is also small. That is, although the first black data is the data of black at a high density level, the interference noise is not appropriately included. On the other hand, although the second black data and the third black data are lower in the density level than the first black data, the second and third black data contain an interference noise to a certain extent. Therefore, the first black correction data is generated based on the first black data and the second black data, and the second black correction data is generated based on the first black data and the third black data. As a result, the black correction data that appropriately contains the interference noise in the first position and the second position can be acquired. The black correction data for performing the shading correction in main scanning direction are generated for the respective positions in the sub-scanning direction other than the first position and the second position based on the first black correction data and the second black correction data. As a result, the black correction data where a fluctuation in the interference noise in sub-scanning direction is taken into consideration can be generated. Further, first reference plate 14a and second reference plate 14b have white regions R1a, R1b, respectively.

Image processor 204 acquires the first white data based on the image signal on white region R1a of first reference plate 14a irradiated by light source 205 in the first position, and generates the first white correction data that is the white correction data in the first position based on the first white data.

Image processor 204, then, acquires the second white data based on the image signal on white region R1b of second reference plate 14b irradiated by light source 205 in the second position, and generates the second white correction data that is the white correction data in the second position based on the second white data.

Image processor 204, then, generates the white correction data according to the respective positions in the sub-scanning direction other than the first position and the second position for performing the shading correction in the main scanning direction based on the first white correction data and the second white correction data.

Image processor 204 performs the shading correction using the black correction data and the white correction data in the respective positions in the sub-scanning direction.

In this configuration, since the first white data and the second white data originally contains the interference noises, the first white correction data and the second white correction data contain the interference noises. For this reason, the white correction data according to the respective positions in the sub-scanning direction other than the first position and the second position are generated based on the first white correction data and the second white correction data. As a result, the white correction data where a fluctuation in the interference noise in sub-scanning direction is taken into consideration can be generated. Thus, the shading correction is performed with the black correction data where the fluctuation in the interference noise in the sub-scanning direction is taken into consideration and the white correction data where the fluctuation in the interference noise in the sub-scanning direction is taken into consideration. For this reason, the shading correction can be performed appropriately based on actual outputs of sensors 207.

Further, when image processor 204 successively reads images of a plurality of documents S, the third black data and the second white data are acquired at least once before the sequential reading of the images of the plurality of documents S is started. On the other hand, the first black data, the second black data, and the first white data are acquired at every time of reading an image of each document S.

That is, when the third black data and the second white data are acquired, sensor module 102 moves to the second position and should acquire an image of second reference plate 14b. When the third black data and the second white data are tried to be acquired every time of reading an image of each document S, sensor module 102 should acquire these data until the position of second reference plate 14b every time when reading of one document
S is ended. Particularly in the image reading device whose document placing region 4 is wide, it takes a long time to sequentially read images of the plurality of documents S. For this reason, the third black data and the second white data are acquired at least once before the sequential reading is started, but are not acquired at every time of reading each document S. As a result, the time required for sequentially reading images of the plurality of documents S can be shortened. On the other hand, the first black data, the second black data, and the first white data are acquired by using first reference plate 14a disposed in the first position around a position where the reading by sensor module 102 is started. For this reason, the data acquisition does not need a long time, and is performed every time of reading an image of document S. This operation enables a temporal change of shading such as temperature characteristics to be also corrected. The third black data and the second white data are not acquired every time of reading an image of each document S, but a number of the acquisition times before the sequential reading of images of a plurality of documents S is started is not limited to one. That is, when the third black data and the second white data should be acquired again during the sequential reading of the plurality of documents S, the sequential reading of the plurality of documents S is interrupted, sensor module 102 is moved to the second position, and the third black data and the second white data may be acquired by using second reference plate 14b.

Second Exemplary Embodiment

A second exemplary embodiment will describe a case where reference sheet 3 is used for acquiring third black data and second white data. That is, in the second exemplary embodiment, reference sheet 3 is a second reference member.

Since parts other than the part of the configuration described here are similar to the first exemplary embodiment, description thereof will be omitted.

[2-1. Reference Plate]

In the second exemplary embodiment, only first reference plate 14a is disposed in a first position, and second reference plate 14b is not disposed. First reference plate 14a is similar in a configuration to the first exemplary embodiment.

[2-2. Acquisition of Data]

Figure 15:
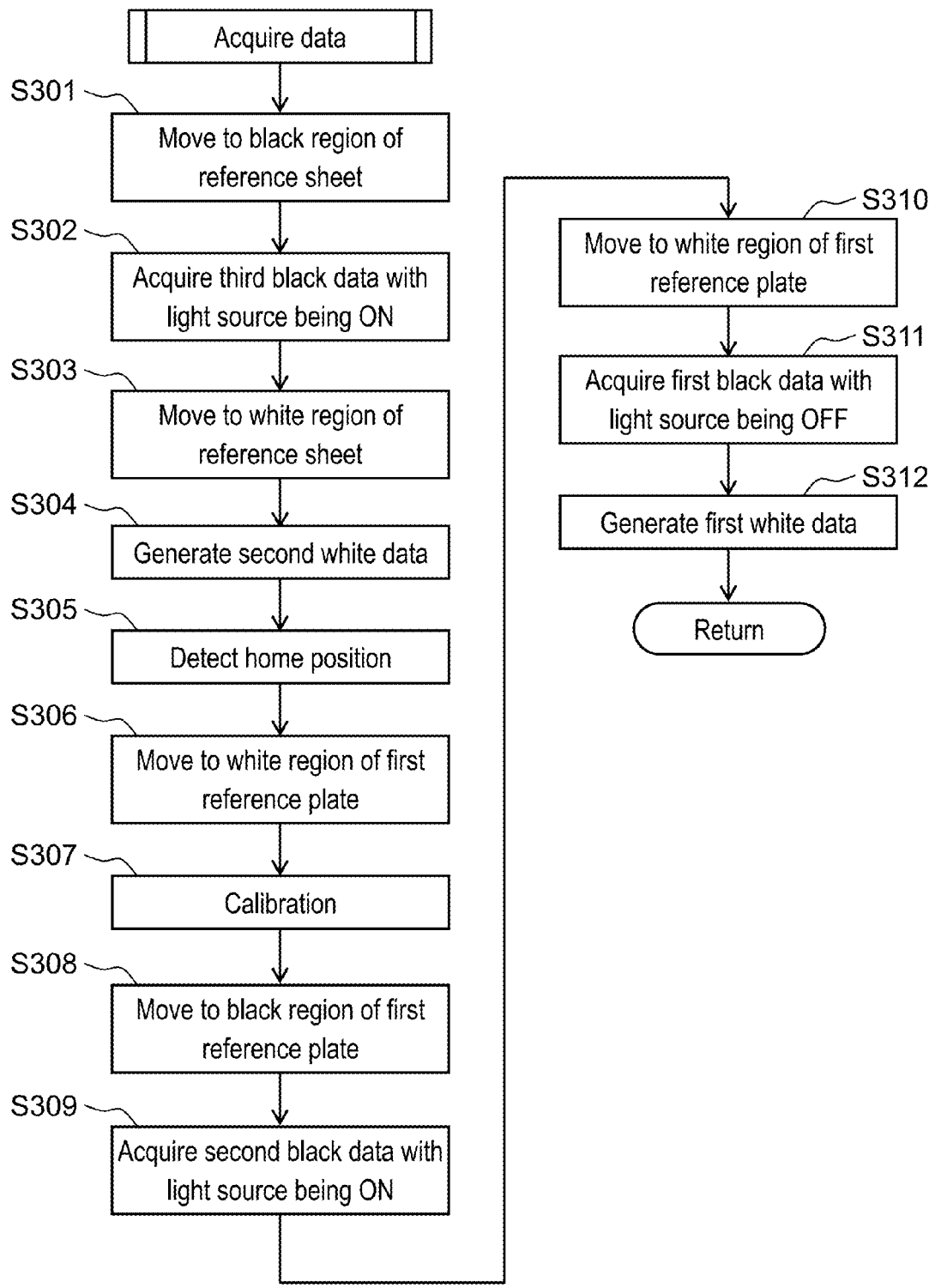
FIG. 15 is a flowchart of a data acquisition process of the image reading device in a second exemplary embodiment.

Acquisition of image data for generating correction data of image reading device 10 in the second exemplary embodiment will be described. FIG. 15 is a flowchart of acquisition of image data in image reading device 10.

In the second exemplary embodiment, after a user places reference sheets on FB glass 12, the user performs a data acquisition operation through an operation unit of image reading device 10 (not shown). As a result, the data acquisition process is started.

Figure 16:
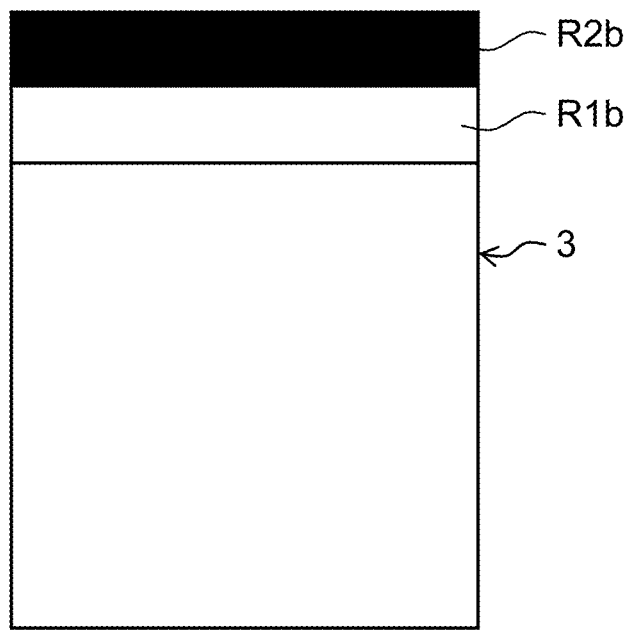
FIG. 16 is a schematic diagram of a reference sheet.

FIG. 16 is a schematic diagram of reference sheet 3. Reference sheet 3 is used for acquiring data necessary for generating shading correction data, and is attached to image reading device 10. Reference sheet 3 is provided with white region R1b and black region R2b. Light reflectance of white region R1b is substantially 100%. White region R1b and black region R2b in the main scanning direction are at least longer in a length than sensor module 102 (more specifically, sensors 207). Dimensions of white region R1b and black region R2b in the sub-scanning direction are larger than dimensions of sensors 207 in the sub-scanning direction. The user sets reference sheet 3 on a predetermined position on FB glass 12. At this time, positions of white region R1b and black region R2b of reference sheet 3 are a second position. The second position is desirably disposed near a reading end position of sensor module 102.

A material of reference sheet 3 may be paper or any material other than paper. Further, reference sheet 3 may be such that image reading device 10 may print white region R1b and black region R2b on paper.

First, image processor 204 moves sensor module 102 to a position facing black region R2b of reference sheet 3 at step S301.

At step S302, image processor 204 causes light source 205 to irradiate black region R2b, and acquires an image of black region R2b. That is, image processor 204 receives the light reflected from black region R2b, and converts the light into an image signal. At this time, although an object is black, image processor 204 receives the light that is emitted from light source 205 and reflected from black region R2b. For this reason, image data based on a third image signal at this time does not represent an output level of sensor 207 of a black color that is at a highest density level, but represents an output level of sensor 207 of a color close to black at a comparatively high density level. Image data of a color close to black at the comparatively high density level is so-called intermediate data. Image processor 204 stores the image data as third black data in memory 203. The third black data is an example of the intermediate data in the second position.

Thereafter, image processor 204 moves sensor module 102 to a position facing white region R1*b* of reference sheet 3 at step S303.

When the movement of sensor module 102 is completed, image processor 204 acquires second white data at step S304. Specifically, image processor 204 acquires an image of white region R1*b* of reference sheet 3 with light source 205 being on. Since the reflectance of white region R1*b* is substantially 100%, the image data based on the image signal at this time, namely, the white data represents an output level of sensors 207 of white at a lowest density level. Image processor 204 stores the second white data as second white correction data in memory 203.

Thereafter, image processor 204 detects a home position at step S305, and causes sensor module 102 to move to the position facing white region R1*a* of first reference plate 14*a* at step S306.

When the movement of sensor module 102 is completed, image processor 204 performs calibration at step S307.

When the calibration is completed, image processor 204 causes sensor module 102 to move to a position facing black region R2*a* at step S308, turns on light source 205 so as to acquire an image at step S309, and stores image data based on the image signal as second black data in memory 203. The second black data is an example of the intermediate data in the first position.

Thereafter, image processor 204 causes sensor module 102 to move to white region R1*a* at step S310, turns off light source 205 so as to acquire an image, and stores the image data as first black data in memory 203 at step S311. The first black data is an example of the black data.

At step S312, image processor 204, then, turns on light source 205 so as to acquire an image of white region R1*a* of first reference plate 14*a*, and stores image data based on the image signal, namely, white data as first white correction data in memory 203.

Since details of the steps are the same as the steps in the first exemplary embodiment, description thereof will be omitted.

Even in the black correction data and the white correction data acquired in the second exemplary embodiment, an influence of crosstalk in the main scanning direction and the sub-scanning direction can be reduced.

[2-3. Conclusion]

In the second exemplary embodiment, reference sheet 3 is used for acquiring the third black data and the second white data. In this exemplary embodiment, the reference sheet is placed on a document placing region, and the black correction data and the white correction data according to the respective positions in the sub-scanning direction are calculated. For this reason, a correction value in an actual document placing region can be calculated, and correcting accuracy is improved.

Further, since second reference plate 14*b* does not have to be provided, the number of parts can be reduced, and the configuration of image reading device 10 can be simplified.

Other Exemplary Embodiments

The exemplary embodiments have been described above as examples of the technologies disclosed in the present disclosure. However, the technologies of the present disclosure can be applied not only to the above exemplary embodiments but can be also applied to exemplary embodiments in which modification, replacement, addition, or removal is appropriately made. Further, the components disclosed in the above exemplary embodiments can be combined to make a new exemplary embodiment. Further, the components described in the accompanying drawings and in the detailed description include not only components necessary for solving the problems but also components unnecessary for solving the problems in order to exemplify the above implementation. For this reason, it should not be immediately recognized that those unnecessary components are necessary just because the fact that those unnecessary components are described in the accompanying drawings and the detailed description.

The exemplary embodiments may be configured as described below.

For example, the exemplary embodiments have described the case where the plurality of sensors 207 is divided into three sectors. However, there is no limitation in the division number of sectors.

Further, scanner unit 11 is connected to controller 100 through FFC 15, without being limited to FFC 15. Any communication cable can be used as the wires between scanner unit 11 and controller 100. For example, scanner unit 11 and controller 100 may be connected by FPC (Flexible Printed Circuits) or the like.

Further, the order of performing the steps of the flowcharts may be arbitrarily changed as long as a desired object is achieved, and further, some steps can be performed in parallel. For example, the order may be changed between the calibration, the acquisition of the second black data, the acquisition of the first black data, the acquisition of the first white data, and the like. Further, in the above description, after all the data are acquired (step S1), the correction data are generated (step S2), but, the first black correction data and the first white correction data may be generated (step S2) while the data are being acquired and just after the data based on the image of first reference plate 14*a* (the first black data, the second black data, and the first white data) can be acquired (for example, before the image of second reference plate 14*b* is acquired). Further, the third black data and the second white data may be acquired before the first black data or the like are acquired.

Further, in the exemplary embodiments, image processor 204 functions as the data generator and the corrector, but it is not limited thereto, and the data generator and the corrector may be separate elements. Further, the data generator and the corrector do not have to be image processor 204, and another processor different from image processor 204 may function as the data generator or the corrector.

Further, in the data acquisition, the second black data and the third black data are acquired based on the images of black regions R2*a* and R2*b* of first reference plate 14*a* and second reference plate 14*b* irradiated by light source 205, without being limited to these images. For example, luminance of the light source is enabled to be adjusted in a plurality of tones, and the second black data and the third black data may be generated based on image signals of white regions R1*a* and R1*b* irradiated with light lower in luminance than the time when the first white data and the second white data are acquired.

Further, the above description has referred to the case where the correction data are generated in two places, namely, the first position and the second position, but the present disclosure is not limited to this, and the shading correction data may be generated in three or more places in the sub-scanning direction.

The present disclosure is appropriate to be used in the image reading device that reads images of documents.

What is claimed is:

1. An image reading device that reads an image of an object, the image reading device comprising:
 a sensor module including a light source that irradiates the object and a plurality of sensors that reads light reflected from the object to acquire image signals;
 a data generator that generates black correction data to be a black reference in shading correction and white correction data to be a white reference in the shading correction; and
 a corrector that performs the shading correction on the image signals acquired by the plurality of sensors using the black correction data and the white correction data, wherein
 the plurality of sensors are disposed in a main scanning direction, and the image signals constitute an image signal on a line extending in the main scanning direction,
 the data generator
  generates the black correction data based on intermediate data lower in a density level than the black reference and higher in a density level than the white reference,
  acquires the intermediate data based on an image signal of a first reference member disposed in a first position and extending in the main scanning direction so as to generate first black correction data that is the black correction data in the first position based on the intermediate data,
  acquires the intermediate data based on an image signal of a second reference member disposed in a second position different from the first position in a sub-scanning direction and extending in the main scanning direction, so as to generate second black correction data that is the black correction data in the second position based on the intermediate data, and
  generates the black correction data according to respective positions in the sub-scanning direction other than the first position and the second position based on the first black correction data and the second black correction data, and
 the corrector performs the shading correction using the black correction data in the respective positions in the sub-scanning direction so as to correct density unevenness of an image in the main scanning direction and the sub-scanning direction, the density unevenness being caused by an interference between the image signals from the plurality of sensors.

2. The image reading device according to claim 1, wherein
 the first reference member and the second reference member each have a black region, and
 the data generator
  causes the plurality of sensors to acquire image signals with the light source being off to acquire black data from the image signals, and acquires the intermediate data based on the image signal of the black region of the first reference member irradiated by the light source so as to generate the first black correction data based on the black data and the intermediate data in the first position, and
  generates the intermediate data based on the image signal of the black region of the second reference member irradiated by the light source so as to generate the second black correction data based on the black data and the intermediate data in the second position.

3. The image reading device according to claim 2, wherein
 the first reference member and the second reference member each further have a white region,
 the data generator
  acquires first white data based on the image signal of the white region of the first reference member irradiated by the light source so as to generate first white correction data that is the white correction data in the first position based on the first white data in the first position,
  acquires second white data based on the image signal of the white region of the second reference member irradiated by the light source so as to generate second white correction data that is the white correction data in the second position based on the second white data in the second position, and
  generates the white correction data according to respective positions in the sub-scanning direction other than the first position and the second position for performing the shading correction in the main scanning direction based on the first white correction data and the second white correction data, and
 the corrector performs the shading correction using the black correction data and the white correction data in the respective positions in the sub-scanning direction.

4. The image reading device according to claim 3, wherein
 when images of a plurality of objects are sequentially read, the data generator acquires the intermediate data and the second white data in the second position at least once before the sequential reading of the images of the plurality of objects is started, whereas acquires the intermediate data and the first white data in the first position every time when an image of each object is read.

* * * * *